United States Patent
Dai et al.

(10) Patent No.: US 7,857,993 B2
(45) Date of Patent: Dec. 28, 2010

(54) COMPOSITE SCINTILLATORS FOR DETECTION OF IONIZING RADIATION

(75) Inventors: Sheng Dai, Knoxville, TN (US); Andrew Curtis Stephan, Knoxville, TN (US); Suree S. Brown, Knoxville, TN (US); Steven A. Wallace, Knoxville, TN (US); Adam J. Rondinone, Knoxville, TN (US)

(73) Assignees: UT-Battelle, LLC, Oak Ridge, TN (US); BWXT Y-12, LLC, Oak Ridge, TN (US)

( * ) Notice: Subject to any disclaimer, the term of this patent is extended or adjusted under 35 U.S.C. 154(b) by 1185 days.

(21) Appl. No.: 10/940,054

(22) Filed: Sep. 14, 2004

(65) Prior Publication Data

US 2006/0054863 A1    Mar. 16, 2006

(51) Int. Cl.
C09K 11/06 (2006.01)
C09K 11/02 (2006.01)
(52) U.S. Cl. .................... 252/301.17; 252/301.18; 252/301.36
(58) Field of Classification Search ............ 252/301.17, 252/301.36, 301.6 S
See application file for complete search history.

(56) References Cited

U.S. PATENT DOCUMENTS

| | | | |
|---|---|---|---|
| 4,795,910 A | | 1/1989 | Henderson et al. |
| 5,334,840 A | * | 8/1994 | Newacheck et al. ...... 250/483.1 |
| 5,973,328 A | | 10/1999 | Hiller et al. |
| 6,495,837 B2 | * | 12/2002 | Odom et al. ........... 250/390.11 |
| 7,199,369 B1 | * | 4/2007 | Heverly .................. 250/361 R |
| 2004/0104356 A1 | | 6/2004 | Bross et al. |
| 2004/0104500 A1 | | 6/2004 | Bross et al. |

OTHER PUBLICATIONS

Dai, Sheng et al. "Nanocrystal-based Scintillators for Radiation Detection", AIP Conference Proceedings, 2002, vol. 632, Issue 1, pp. 220-224.*
Citation information for Dai, Sheng et al. "Nanocrystal-based Scintillators for Radiation Detection", accessed from http://search.ebscohost.com/login.aspx?direct=true&db=aph&AN=7431137&site=ehost-live, Jun. 25, 2008.*
Saengkerdsub, Suree et al. "Pechini-type in-situ polymerizable comples (IPC) method applied to the synthesis of $Y_2O_3$:Ln (Ln=Ce or Eu) nanocrystallites" J. Mater. Chem., 2004, vol. 14, pp. 1207-1211.*
Talapin et al. "Highly Luminescent Monodisperse CdSe and CdSe/Zn Nanocrystals Synthesized in a Hexadecylamine-Trioctylphosphine Oxide-Trioctylphosphine Mixture" Nano Letters, 2001, vol. 1, No. 4, pp. 207-211.*
S. Wallace, et al., "Neutron Detector Based on Lithiated Sol-Gel Glass," Nuclear Inst. Method in Physics Research A, 2002, pp. 764-773, vol. 483.

(Continued)

*Primary Examiner*—Mark Eashoo
*Assistant Examiner*—Peter F Godenschwager
(74) *Attorney, Agent, or Firm*—Scully, Scott, Murphy & Presser, P.C.

(57) ABSTRACT

Applicant's present invention is a composite scintillator having enhanced transparency for detecting ionizing radiation comprising a material having optical transparency wherein said material comprises nano-sized objects having a size in at least one dimension that is less than the wavelength of light emitted by the composite scintillator wherein the composite scintillator is designed to have selected properties suitable for a particular application.

25 Claims, 13 Drawing Sheets

OTHER PUBLICATIONS

M. Bliss, et al., "Real-Time Dosimetry for Boron Neutron-Capture Therapy," IEEE Transactions on Nuclear Sci., 1995, pp. 639-643, vol. 42, No. 4.

M. Ghioni, et al., "Compact Active Quenching Circuit for Fast Photon Counting with Avalanche Photodiodes," Rev. Sci. Instrum, 1996, pp. 3440-3448, vol. 67, Issue 10.

C.B. Murray, et al., "Synthesis and Characterization of Nearly Monodisperse CdE (E=S, Se, Te) Semiconductor Nanocrystallites," J Am Chem Soc, 1993, pp. 8706-8715, vol. 115.

S. Pathak, et al., "Hydroxylated Quantum Dots as Luminescent Probes for In Situ Hybridization," J Am Chem Soc, 2001, pp. 4103-4104, vol. 123.

O. Lehmann, et al., "Synthesis, Growth, and Er3+ Luminescence of Lanthanide Phosphate Nanoparticles," J Phys Chem B, 2003, pp. 7449-7453, vol. 107.

M. Bruchez, et al., "Semiconductor Nanocrystals as Fluorescent Biological Labels," Science, 1998, pp. 2013-2016, vol. 281.

B.O. Dabbousi, et al., "(CdSe)ZnS Core—Shell Quantum Dots: Synthesis and Characterization of a Size Series of Highly . . . ," J Phys Chem B, 1997, pp. 9463-9475, vol. 101.

S. Saengkerdsub, et al., "Pechini-Type In-Situ Polymerizable Complex (IPC) method Applied to the Synthesis of," J of Mat. Chem., 2004, pp. 1207-1211, vol. 14.

A.S. Stephan and S. Dai, "Modeling of Fluroescent Particle/Lithiated Matrix Material Neutron Scintillators," 2003 Am Nuclear Soc Student Conf., 2003, pp. 1-18.

* cited by examiner

COMPOSITE SCINTILLATORS FOR DETECTION OF IONIZING RADIATION

The United States government has rights in this invention pursuant to contract no. DE-AC05-00OR22725 between the United States Department of Energy and UT-Battelle, LLC.

FIELD OF THE INVENTION

The present invention relates to scintillators for detection of ionizing radiation, and more particularly, to composite scintillators having enhanced transparency comprising transparent material of nano-sized objects having a size in at least one dimension that is less than the wavelength of light emitted by the composite scintillator for detection of a wide variety of ionizing radiation.

BACKGROUND OF THE INVENTION

Scintillators, defined as materials that emit light upon absorbing ionizing radiation or energy from ionizing radiation, are one of the primary means for detecting most kinds of radiation. There is a need among the research, defense and industrial communities for scintillators that demonstrate improved capabilities in terms of light output, detection efficiency, high count rate capability, better time resolution of events, and for neutron scintillators, fewer false counts due to gamma rays.

At this time, the greatest deficiency in the area of scintillators is in neutron scintillators. Neutrons are uncharged particles that can travel through matter without ionizing the matter. Because neutrons travel through matter in such a manner, neutrons are difficult to detect directly. Some other evidence of a neutron event must be detected in order to determine its existence. An indirect method detects the results of a neutron interaction event and not the neutron itself per se. (For example, recoil protons from fast neutrons scattering off hydrogen atoms and alpha and triton particles emitted when $^6$Li captures a neutron, all give off energy that can be measured.)

Neutron scintillators can be broadly grouped into two categories: intrinsically neutron-sensitive scintillators and composite neutron scintillators. This grouping can also be made on other bases, most notably optical transparency; intrinsically neutron-sensitive scintillators are usually quite transparent and composite scintillators are usually substantially opaque. Intrinsically neutron-sensitive scintillators (e.g., cerium-activated lithium-bearing glass) are very well known and their operating principles are extensively described in the literature. Composite neutron scintillators usually consist of scintillation particles (hereafter referred to as fluorescent dopant particles to avoid confusion) dispersed in a matrix material containing neutron-sensitive atoms (e.g., neutron target material), although other configurations are possible. Neutrons interact with neutron-sensitive atoms (e.g., $^6$Li, $^{10}$B) in the matrix material, producing reaction products (usually charged particles) that travel some distance (typically microns to tens of microns) through the composite scintillator, relinquishing their energy as they go. If the fluorescent dopant particles are present at a sufficient concentration and are not too large, most or all of the reaction products will at some point enter one or more fluorescent dopant particle and deposit energy in them, the fluorescent dopant particles then producing scintillation light emission that is generally proportional to the amount of energy deposited in them. (The actual scintillation light emission intensity is affected by the linear energy transfer value of the reaction products, possible energy transfer effects across matrix-fluorescent dopant particle boundaries, etc.) Variations on this are possible, such as using a matrix material that emits scintillation light (in addition to the light emitted by the fluorescent dopant particles) or encapsulating neutron-sensitive atoms in dopant particles and using a scintillation matrix material. The most common composite neutron scintillators consist of ZnS:Ag particles in matrices containing $^6$Li, $^{10}$B, or H atoms.

There are two common reasons for using composite neutron scintillators in lieu of intrinsically neutron-sensitive scintillators. The first is that, generally speaking, the more intense the light emission by a scintillator, the better, and some non-neutron sensitive fluorescent materials yield much greater light output than intrinsically neutron-sensitive scintillators. For example, an optimized ZnS:AeLiF combination may emit 150,000 photons per neutron capture, whereas a $^6$Li-bearing cerium-activated glass scintillator may emit around 10,000 photons per neutron capture. The second reason is that some composite scintillators can yield much better neutron-gamma discrimination than intrinsically neutron-sensitive scintillators. (In most neutron detection applications, the ability to detect neutrons without false neutron counts produced by gamma rays is critical.) The same type of scintillation material produces different quantities of light emission per unit of energy deposited in the scintillator depending on the type and energy of charged particle depositing the energy. The ratio of light emission produced by heavy charged particles (e.g., $^6$Li reaction products) to that produced by electrons (gamma rays relinquish their energy via electrons) per unit of deposited energy for non-neutron sensitive ZnS:Ag, for example, is much higher than that for $^6$Li-bearing cerium-activated glass. Thus, a composite scintillator based on ZnS:Ag can much more effectively discriminate between neutron- and gamma-induced scintillation events by rejecting low pulse amplitude events, all other things being equal.

The major drawback to composite scintillators is their tendency to be optically opaque, making them useable only in a thin film form, limiting their efficiency for detecting neutrons. A major source (normally the most important source and sometimes the only significant source) of this is a mismatch of optical indices between the materials forming the composite scintillator (e.g., fluorescent dopant particles, matrix material, neutron target dopant particles if the neutron-sensitive material is added that way). Scintillation photons traveling through the composite scintillator scatter or reflect at the material boundaries and thus must travel a much greater distance between reaching the edge of the scintillator and exiting, thus giving them a greater opportunity to be absorbed along the way. As such scintillators are made thicker, the pulse amplitudes from the additional neutron counts thereby gained rapidly decreases. The consequent lack of consistent neutron pulses amplitude, and thus a neutron capture reaction energy peak, makes it very difficult to know where to set specific minimum amplitude for rejection of non-neutron (e.g., gamma) pulses and to know what fraction of gamma and what fraction of neutron pulses are accepted and rejected as a result.

Scintillators may be used for the detection of other kinds of radiation as well. For example, some alpha and beta particle detectors use a thin layer of scintillator covered by a light-tight cover. Scintillators are commonly used for gamma ray spectroscopy, although very high-resolution applications use semiconductor detectors. Gamma scintillators with higher efficiencies and therefore increased light yields will demonstrate better energy resolution, potentially enabling their use in gamma ray spectroscopy applications that are currently restricted to using semiconductor devices. Faster gamma scintillators are also desirable as some of the brightest and most widely used gamma scintillators (for example, thallium-doped sodium iodide, NaI:Tl), have decay times in the hundreds of nanoseconds or longer and this does limit their use in some very high-speed applications.

Neutron radiation is an unequivocal signature of the presence of transuranic elements associated with nuclear power-generated plutonium and enriched uranium and plutonium derived from the disassembly of nuclear weapons. Both passive and active neutron detection methods have been used in such applications, with the latter involving detection of the secondary fission neutrons induced by a brief pulse of neutrons. The prerequisite for neutron scintillators is the presence of neutron target elements (including neutron absorbing elements), which is not required for the fabrication of other radiation scintillators such as beta and alpha radiations. Favored isotopes for neutron target material include $^{10}B$, $^{6}Li$, $^{3}He$, and $^{235}U$, all of which have high absorption cross sections for thermal neutrons. In previous work by Wallace et. al. (*Nuclear Instruments and Methods in Physics Research A*, 2002), a surface barrier detector based on sol-gel technology was reported as part of an active interrogation method for identifying the presence of uranium. Then, Im et al. reported in *Applied Physics Letters*, March 2004, an approach to neutron scintillator fabrication that employs a room temperature sol-gel processing.

Industries and geological survey agencies who use or need to detect neutrons are interested in the development of new neutron detectors with advantages in detection efficiency (and therefore sensitivity) and versatility over the methods in current use. An improved neutron detector technology could even play a role in national security in screening for insecure fissile weapons materials. Currently, many solid-state neutron scintillators such as $^{6}Li$-doped silica glasses are prepared by high-temperature methods. Because of the high temperature employed, these materials are very difficult to integrate as films into electronic devices for neutron detection or to cast as large screens. Furthermore, the high temperature methods eliminate the possibility of using organic scintillators because such organic compounds are seldom stable at elevated temperatures. Thus, the development of efficient solid-state scintillation materials, which will significantly enhance general capabilities for in situ monitoring and imaging of radioactive contaminants in the environment, is demanded.

Neutron detection for monitoring the dose of thermal neutrons given to patients receiving boron neutron-capture therapy has used lithium-6 and a cerium activator in a glass fiber (M. Bliss et. al., IEEE Trans. Nucl. Sci., 1995). Hiller et. al., in U.S. Pat. No. 5,973,328, issued on Oct. 26, 1999, improve this technique by allowing a cerium-activated glass fiber to be coated with fissionable elements. A wet chemistry method of placing radioactive fissile elements into glass—which in the vitrified state does not pose a hazard—as described in the '328 patent using sol-gel based technology, is a significant benefit. The '328 device introduced sol-gel techniques unique in the art of neutron detection. Sol-gel chemistry was first discovered in the late 1800s.

Emission detectors such as microchannel plates, channeltrons, and avalanche photodiodes are commonly used for detecting ultraviolet (UV) light and fissioned charged particles such as electrons or protons. M. Ghioni et. al. (1996) describe an avalanche photodiode implementation for detecting neutron induced ionization and optical pulse detection. Microchannel plates are commercially available and well known in the art. Typically, a microchannel plate is formed from lead glass having a uniform porous structure of millions of tiny holes or microchannels. Each microchannel functions as a channel electron multiplier, relatively independent of adjacent channels. A thin metal electrode is vacuum deposited on both the input and output surfaces to electrically connect channels in parallel. Microchannel plates can be assembled in stacked series to enhance gain and performance. The '328 patent demonstrated the use of a microchannel plate for the detection of neutrons.

The microchannel plates serve to amplify emissions from fissionable material resulting from the bombardment of neutrons. The amplified signal is then detected and recorded. The signal frequency is proportional to the charged particle emissions, which are proportional to the amount of neutrons bombarding the fissionable material.

Typically, due to the exotic materials and sensitivity of the equipment, the neutron detectors currently available are expensive and difficult to maintain. For example, helium-3 is an extremely rare stable isotope which must be separated at considerable expense from the radioactive gas tritium. Furthermore, the use of a gas absorber results in a slower response time than a solid absorber as disclosed herein. The '328 device thus incorporated fissionable material into a sol-gel composition in combination with an emission detector.

OBJECTS OF THE INVENTION

Accordingly, it is an object of the present invention to provide crack-free composite scintillators having enhanced transparency for detecting a wide variety of different kinds of ionizing radiation.

It is another object of the present invention to provide crack-free composite scintillators having enhanced transparency with high scintillation light emission intensity.

It is yet another object of the present invention to provide crack-free composite scintillators having enhanced transparency for neutron detection that exhibit low gamma interference (e.g., false neutron counts produced by gamma rays).

It is another object of the present invention to provide crack-free composite scintillators having enhanced transparency with high count rate capabilities.

It is yet another object of the present invention to enable ionizing radiation detectors with improved ruggedness and durability compared with many existing devices to be made.

It is a further object of the present invention to provide a means by which special properties such as high fluorescence emission intensity and rapid light emission, of nano-sized objects and structures whose size in one dimension is less than the wavelength of emitted light may be effectively utilized in the detection of ionizing radiation.

It is another object of the present invention to provide crack-free composite scintillators having enhanced transparency and having multiple functionalities for simultaneously detecting different types of radiation with the signals from the different types being readily separable.

These and other objects, features and advantages of the present invention will become apparent after a review of the following detailed description of the disclosed embodiments and the appended claims.

SUMMARY OF THE INVENTION

In accordance with one aspect of the present invention, the foregoing and other objects are achieved by a composite scintillator having enhanced transparency for detecting ionizing radiation comprising a material having optical transparency wherein said material comprises nano-sized objects having a size in at least one dimension that is less than the wavelength of light emitted by the composite scintillator wherein the composite scintillator is designed to have selected properties suitable for a particular application.

Figure 1:
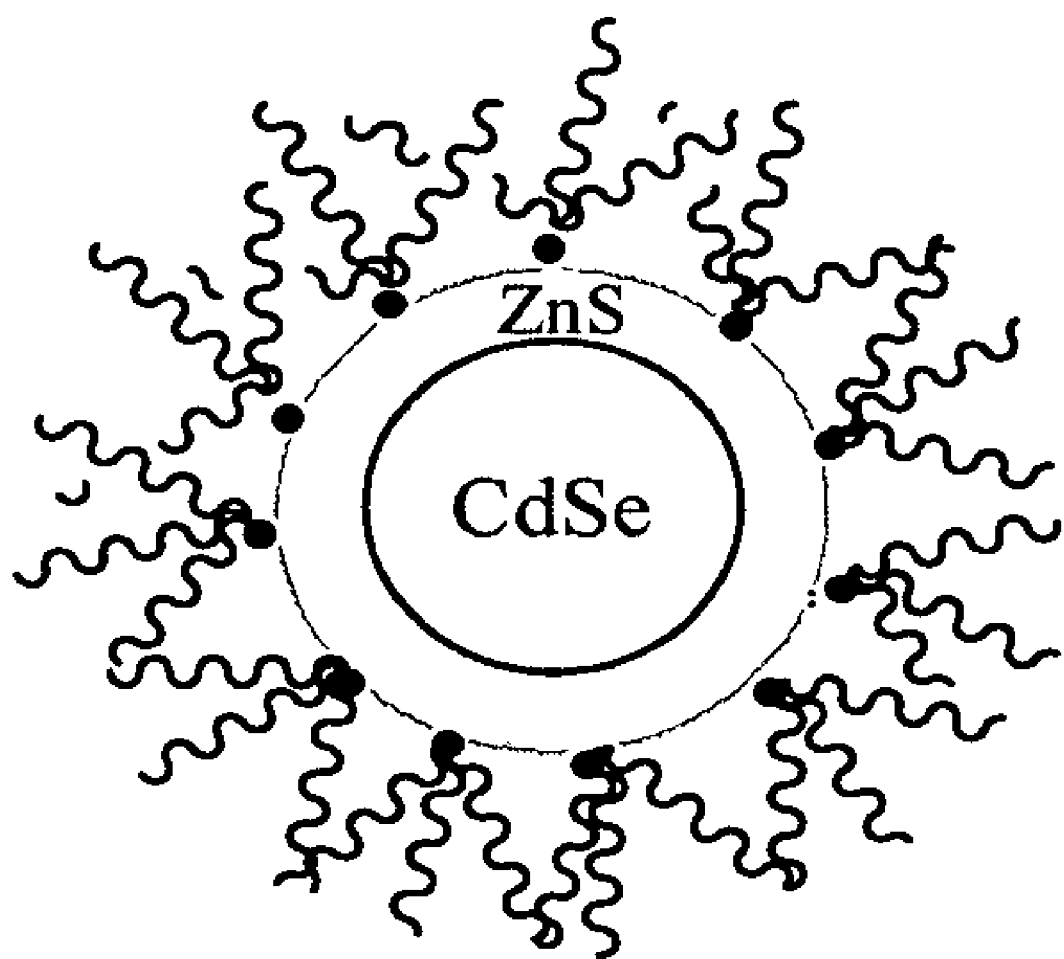
FIG. 1 is a schematic of the structure of CdSe/ZnS core/shell nanocrystals.

For a better understanding of the present invention, together with other and further objects, advantages and capabilities thereof, reference is made to the following disclosure and appended claims in connection with the above-described drawings.

DETAILED DESCRIPTION OF THE INVENTION

Applicant's present invention is a new class of composite radiation scintillators having enhanced transparency comprising a transparent material of nano-sized objects having a size in at least one dimension that is less than the wavelength of light emitted by the composite scintillator. In one embodiment, the transparent material is a transparent matrix material, such as inorganic sol-gel precursor solution, an organic polymer precursor solution or other transparent material, doped with at least one type of nano-sized objects which includes nanoparticles, nanocrystals or other nano-sized structures which have a size in at least one dimension that is less than the wavelength of emitted light). In another embodiment, the transparent material comprises layers of nano-sized objects that are not doped within a matrix material wherein the thickness of layers are less than the wavelength of the light emitted by the composite scintillator. The nano-sized objects can be embedded in a matrix material or otherwise used in combination (such as a multiplicity of nano-sized objects placed in close proximity or placed with a large non-nano-sized object), with light emission used as an indicator of the presence of ionizing radiation. A type of nano-sized object may function as a scintillation (fluorescing) material or neutron target material. The neutron target material comprises neutron absorbing material and/or material that produces recoil ions or other ionizing radiation upon scattering an energetic neutron. The neutron target material yields at least one particle of ionizing radiation when a neutron interacts with the neutron target material. Examples of such ionizing radiation include an electron, a proton, a triton, an alpha particle, a fission fragment or a photon. The scintillation or fluorescing material (also known as fluorescent nano-sized objects such as nanoparticles or nanocrystals) is provided to scintillate when traversed by at least one of an electron, a proton, a triton, an alpha particle, a fission fragment, or other charged particle. The dispersion of fluorescent or neutron target nano-sized objects in a matrix material, such as sol-gel or a polymer matrix, may be achieved by the surface modifications of nanoparticles with capping agents. Both fluorescent nano-sized objects and neutron target materials may be in a nano-sized form or bulk (all dimensions greater than the wavelength of visible light) form.

One embodiment, mentioned above, of the present invention is fluorescent nanoparticles (also referred to as nanoparticles, nanocrystals or quantum dots) and/or neutron target nanoparticles doped into a transparent matrix, such as sol-gel glass, glass, PS (polystyrene), PVT (polyvinyltoluene), PMMA (poly(methyl methacrylate)), etc. For purposes of Applicant's invention, nanoparticles include nanocrystals and quantum dots; these terms are often used loosely in an interchangeable way. "Quantum dots" is a specific term used only for semiconductor nanocrystals with well-defined spherical shape. Scintillators based on Applicant's present invention have enhanced transparency and may be used for detecting a wide variety of ionizing radiation. The basic principle is that ionizing radiation passing through the composite scintillator deposits energy in the scintillator and causes excitation of individual nanoparticles or other nanostructure that will then fluoresce. The energy forms which produce fluorescence are electron-hole pairs and excitons. The emitted light is then detected by a photo detector or some other means, thus indicating the presence of radiation. By comparing the signal produced by the photo detector or other device, with the known response characteristics of the scintillator, information about the incident radiation particle or flux is deduced. The light emitted by the scintillator can cover a wide variety of wavelengths but will normally be in the UV to visible range. The light emission intensity depends on the type, number, and geometry of the nano-sized objects whether they are nanoparticles or other nanostructures located in the composite scintillator. In a composite scintillator comprising fluorescent nanoparticles (or other nano-sized objects) embedded in a matrix containing neutron-sensitive material, depending on the properties of the nanoparticle or nano-sized object and matrix material used, only energy deposited in the nanoparticle or nano-sized object directly by the radiation may produce fluorescence or energy deposited in the matrix itself can also cross into the nanoparticle or nano-sized object from the matrix and produce fluorescence. This fluorescent light emission is used as an indicator of the presence of ionizing radiation.

Many nano-sized objects, such as nanoparticles, fluoresce (often with a very high quantum yield) upon excitation through one means or another. The properties of some nano-sized objects or nanoparticles are well suited for production of fluorescence upon excitation by ionizing radiation. In Applicant's invention, pure nanoparticles are in the form of a very fine powder. By embedding them in a transparent matrix, such as sol-gel glass, glass, PS (polystyrene), PVT (polyvinyltoluene) or PMMA (poly(methyl methacrylate)), the nanoparticles can be formed into particular geometries and given mechanical integrity. Placement in a transparent matrix also vastly improves or enhances the transmission of light through the material.

Optical transparency through nano-sized structures. Pure nanoparticles or other nano-sized objects such as nanocrystals, in a powder form, appear white due to optical reflection at the particle boundaries. Maximizing the transmissibility of light in the scintillator is of utmost importance because it is one of the primary determinants of energy resolution. It also determines how thick a scintillator may be employed in an application, and thus the radiation detection efficiency of the scintillator. Past examples of neutron scintillators formed by mixing disparate materials (for example, ZnS:Ag and LiF) have had poor light transmission through the scintillators due to light reflection at the boundaries between the materials. Optical index matching to substantially reduce or eliminate this reflection has not been very effective due to the high optical indices of the appropriate fluorescing particles (for example, ZnS:Ag). Applicant's present invention moves to a nanoparticle format for which the particle size is less than the wavelength of the light emitted by the scintillator. In using this special property of light, namely that when it traverses a region shorter than its wavelength, it does not behave in the normal way at a particle boundary and scatter or reflect, but instead it passes through the region without alteration in direction. This effect begins appearing when the straight-line travel path distance through the region is less than the wavelength of the photon, and in Applicant's preferred embodiment, is fully in effect when the distance is less than half the photon wavelength. Thus, this judicious sizing of composite scintillator components enables good and enhanced optical transparency to be achieved even when the optical indices of the composite scintillator components are ill-matched.

An important function of a matrix structure comprising nanoparticles (or other nano-sized objects) is to space the nanoparticles out and hold them in a constant location. When nanoparticles are merely piled upon each other in a powder form, many of their boundaries are contiguous, forming paths through them that are longer than the wavelength of visible light. This effect then enables photons of light to scatter at the nanoparticle boundaries, making them appear white, when in a powder form. Dispersing the nanoparticles in a transparent matrix material solves this problem and enables transparent nanoparticles to actually appear transparent within the scintillator.

Optical transparency through the use of nano-sized objects is not limited to nanoparticles. For example, nano-sized layers may be sandwiched together to form a composite scintillator with the layers having a thickness less than the wavelength of the emitted scintillation photons but a much greater width and length than the wavelength of the emitted scintillation photons. In this example, scintillation light will travel with little attenuation through the composite scintillator in a direction at right angles to the layers in the composite scintillator.

Customization of composite scintillator characteristics through design parameter selection. A number of scintillator characteristics can be customized or designed for a particular application through the choice of the fluorescent nano-sized objects. Different types of fluorescent nano-sized objects such as nanoparticles have different light emission characteristics such as quantum yield (intensity per unit of energy transferred to a nanoparticle), light emission wavelength, and fluorescence decay time. When developing a scintillator for position-sensitive neutron detection in neutron scattering experiments, light emission in the range of approximately 350-480 nm is desired when a wavelength-shifting fiber readout system is used. For gamma detection in conjunction with a semiconductor-based photo detector, light emission in the range of approximately 550-620 nm is desirable. The desired light emission wavelength spectrum is a function of the type of photo detector used, as opposed to the type of particle being detected. (In both cases, other wavelengths will also work with the photo detectors but with reduced light detection efficiency.) Different characteristics may be achieved using different types of nanoparticles or even the same type of nanoparticle but with a different particle size. Some nanoparticles (or nano-sized objects) are tunable so they have desired light emission characteristics. For example, the CdSe/ZnS core/shell nanocrystals (shown in FIG. 1) may have their light emission wavelength tuned over the approximate range of 470-620 nm by growing the nanoparticles to different particle sizes.

Scintillator performance optimization through design on a millimeter to a nanometer scale. Another characteristic is the use of structure and design on a scale of nanometers to millimeters (primarily nanometers to hundreds of microns), in order to produce particular qualities and multiple functionalities in the scintillator. For example, fluorescent nano-sized objects or nanoparticles may be doped into small particles of lithium-doped material (material may have other neutron target material other than lithium-6) to form composite scintillator spheres of sub-millimeter size, and these spheres, in turn, doped into an inert transparent matrix to form a monolith. Neutron interactions with lithium-6 (or other neutron target material) in the spheres produce light emission as the lithium-6 reaction products pass through the nanoparticles present in the spheres, depositing energy into them. Since the range of the lithium-6 reaction products is quite short, most reaction products do not escape the spheres in which they originated. In contrast, gamma ray interactions are distributed in an approximately uniform way throughout the monolith. Since the range of the electrons produced by the gamma interactions is long compared to the size of the spheres embedded in the monolith, the fraction of the electron path length (and thus energy deposited) in the various regions in the monolith (inert matrix, spheres and fluorescent nanoparticles embedded in the spheres) is very nearly proportional to the relative volume occupied by the different regions in the monolith. This has the effect of considerably reducing the intensity (and therefore the amplitude) of the gamma scintillation pulses, in comparison to the neutron-induced scintillation pulses as the energy deposited by the lithium-6/neutron reaction products is almost exclusively deposited in the spheres and the embedded nano-sized objects or nanoparticles they contain (light emission being produced by the embedded nano-sized objects or nanoparticles), whereas much of the gamma-induced electron energy is deposited in regions of the monolith that do not produce light. Numerous variations of this embodiment are possible.

Figure 2:
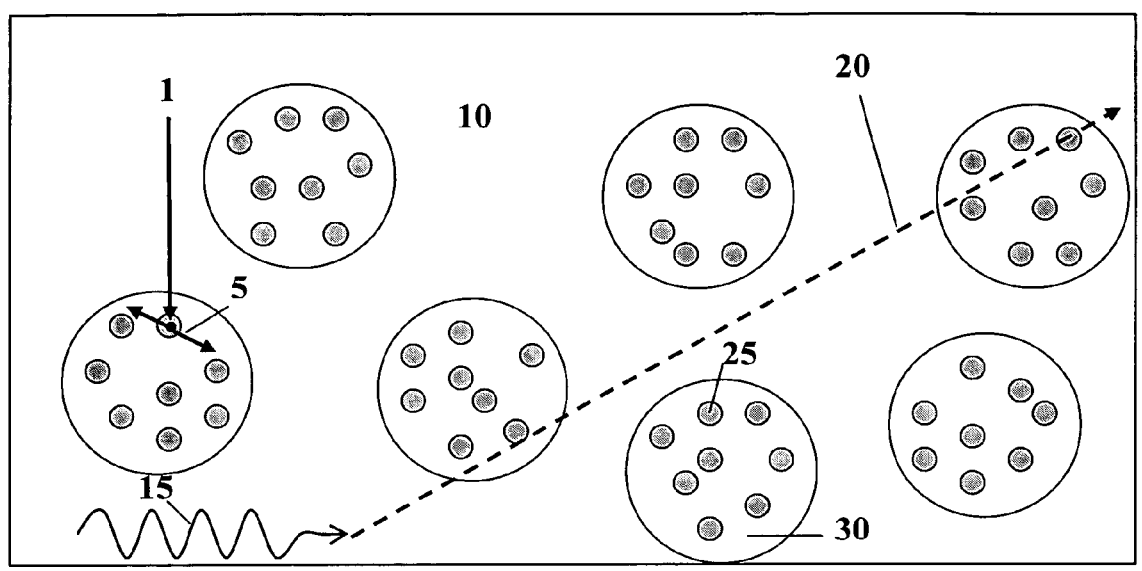
FIG. 2 is a schematic of a composite scintillator in which $Li_3PO_4$ nanoparticles are doped into plastic scintillator matrix material illustrating how micro-scale structures are used with nano-scale structures to optimize scintillator performance characteristics.

FIG. 2 illustrates how micro-scale design can be combined with nanoscale structures to optimize composite scintillator design and achieve particular characteristics that are desired. FIG. 2 shows a composite scintillator in which $Li_3PO_4$ nanoparticles 25 are doped into plastic scintillator matrix material 10. The plastic scintillator in turn forms micro-sized spheres (or other shapes) 30 that are embedded in an inert (a non-fluorescent) matrix material 10. The design shown in FIG. 2 is intended to minimize the amplitude of pulses from gamma rays compared to the amplitude of neutron pulses in order to maximize the ability of a detector based on this composite scintillator design to distinguish between neutrons and gamma rays. A key design feature is that the plastic scintillator spheres 30 are small compared to the path length of electrons 20 produced by gamma ray 15 interactions but on the same scale or larger than the path length of the reaction products 5 from neutron absorption.

When neutron capture events occur in the $Li_3PO_4$ nanoparticles 25 in the plastic scintillator, the $^6Li$ reaction products 5 usually deposit most or all of their energy inside the plastic scintillator spheres 30, producing a large scintillation pulse. Neutrons 1 are almost captured by these target material nanoparticles (as opposed to other composite scintillator components) due to the high neutron capture cross section of $^6Li$ and the low neutron capture cross section of other constituent materials. On the other hand, gamma rays 15 interact nearly uniformly throughout the composite scintillator. Because the path length of the electrons 20 from gamma ray interactions are large compared to the plastic scintillator sphere 30 sizes, the electrons are unable to remain inside a single plastic scintillator sphere 30 throughout their entire path length 20 and instead spend a substantial fraction of their path length traveling through the inert (non-fluorescent) composite scintillator matrix material 10. As a result, much of their energy is deposited in the inert matrix material 10, not in the plastic scintillator spheres 30, and thus, their pulse amplitude decreases commensurately. By substantially decreasing the size of the gamma pulses compared to the neutron pulses, much improved neutron-gamma discrimination results.

Combining design on a micro-scale with design on a nano-scale, or alternatively, different types of nano-scale design with other nano-scale design, can yield particular characteristics that may be desirable for different applications. Examples of possible enhanced characteristics include relative pulse amplitude for different radiation types, different pulse shapes for different radiation types or for events in different regions of the composite scintillator, different scintillation light emission spectra for different types of radiation, bias of the different of scintillation light transport, etc.

During the past two decades, there have been extensive investigations on crystalline, semiconductor nanoparticles (nanocrystals). These nanoparticles are highly crystalline in this case, so they are referred to as nanocrystals. Nanocrystals are often composed of atoms from groups II-VI elements in the periodic table. When the sizes of the nanoparticles become comparable to or smaller than the bulk exciton Bohr radius, unique optical and electronic properties occur. These effects arising from the spatial confinement of electronic excitations to the physical dimensions of the nanoparticles are referred to as quantum confinement effects. One such effect is the quantization of the bulk valence and conduction bands which results in discrete atomic-like transitions that shift to higher energies as the size of the nanoparticle decreases. With the size-dependent optical properties of nanoparticles (especially photoluminescence property), nanoparticles with specific sizes can be made for specific detection wavelengths over the whole UV/V is range.

In 1993, Bawendi and coworkers synthesized highly luminescent CdSe nanocrystals by using high-temperature organometallic procedure. Later, the deposition of a surface-capping layer such as ZnS or CdS in the core/shell structure was also found to dramatically increase the quantum yields of CdSe nanocrystals up to 40-50% at room temperature. Applicant's present invention involves the use of highly luminescent groups II-VI semiconductor nanocrystals (particle size range: 1 to 20 nm) as a new class of radiation detectors. The nanocrystals prepared (see Example 1 below) were compatible to various inorganic and organic matrices. The quantum confinement effects enabled the nanocrystals to be used with a wide variety of detectors. With the combination of advantages from nanochemistry and sol-gel chemistry, the nanocrystals were embedded into sol-gel matrix and optically clear sol-gel scintillators were obtained.

Neutron scintillators. Neutron sensitivity is achieved by including atomic isotopes that emit an energetic charged particle upon absorbing a neutron as neutron target material in the composite scintillator. Examples of such isotopes (neutron target materials) include but are not limited to B-10, Li-6, Gd-157, U-235 and U-238. He-3 can be used if a method were developed to form dopant particles containing He-3 gas bubbles (preferably at considerable pressure). The neutron target isotopes may be incorporated into the fluorescent nanoparticles (if appropriate), chemically bonded to the surface of the nanoparticles, placed as dopant materials embedded in the material surrounding the fluorescent nanoparticles, formed as layers sandwiched between layers of fluorescent material (material that contains embedded fluorescent particles or is itself inherently fluorescent), formed into nanoparticles that are then embedded in a fluorescent matrix material or embedded in a transparent matrix along with fluorescent nanoparticles, etc. The energetic charged particles created by the neutron interaction travel some microns through the composite scintillator as they relinquish their energy and stop. Their rate of energy deposition per unit of travel distance is roughly proportional to the density of the materials through which they pass. Energy that is either directly deposited in the fluorescent nanoparticles or nano-sized objects or passes into them from the material surrounding them (if the latter happens, the nanoparticles are acting as activators) causes the nanoparticles to scintillate (emit light).

The most basic embodiment of the neutron scintillator is that in which neutron target materials (materials producing an energetic charged particle upon absorbing a neutron) are mixed into a transparent matrix that has fluorescent nanoparticles embedded throughout it. Absorption of neutrons by the neutron target material results in the production of one or more energetic charged particles that then travel through the scintillator, depositing energy in both the nanoparticles and the matrix material. Energy that is either deposited directly into or migrates into the nanoparticles from the surrounding area causes the nanoparticles to scintillate/fluoresce. There are particular combinations of nanoparticle size and nanoparticles and neutron target material loading levels in the scintillator that are optimal for particular applications. The particular combination depends on the user's priorities with respect to intensity of light emission, neutron detection efficiency, neutron-gamma discrimination, density of the various materials involved (transparent matrix, neutron target material, nanoparticle dopants), and other factors and optimized combinations of composite scintillator design parameters can be determined using simulations and experiments, simulations requiring that appropriate properties regarding the scintillator constituent materials are known. A wide variety of more advanced designs of neutron scintillators can easily be devised based on the principles of compound structures, wavelength tuning, energy-sensitivity tuning and other concepts.

Calculations have been performed in Applicant's invention to determine optimized design characteristics for composite scintillators using nano-sized components. Factors such as size of the nanoparticles and their concentration in the composite scintillator must be carefully considered in order to determine optimized design characteristics of the desired composite scintillator. For example, if a composite scintillator for neutron detection is desired, critical performance parameters include maximization of the scintillation light emission intensity from a neutron detection event, consistency in the light emission intensity from one neutron detection event from another, and maximization of the probability that a neutron event will actually produce scintillation light emission. To elaborate on the second point, scintillators using neutron absorbers such as $^6Li$ as their neutron target material that produce a consistent energy release from a nuclear reaction upon neutron absorption should produce a narrow reaction energy peak to maximize discrimination between neutron and other sources of signals such as gamma rays and noise.

FIG. 3 illustrates the effect of fluorescent dopant particle size on scintillator characteristics. The term fluorescent dopant particle is used herein in lieu of fluorescent nanoparticles as it is more generic and includes both nano-sized particles and non-nano-sized particles. FIG. 3 shows neutron target atoms 35 and the arrows extending out from them represent reaction products 40 emitted upon absorption of a neutron. The spheres 45 represent fluorescent dopant particles embedded within a transparent matrix material 50 that contains the neutron target atoms 35. Spherical fluorescent dopant particles 45 actually appear as circles of different sizes in a cross section taken at random. These fluorescent dopant particles do not necessarily have to be spherical in shape, they can be of other geometrical shapes as well.

Figure 3A:
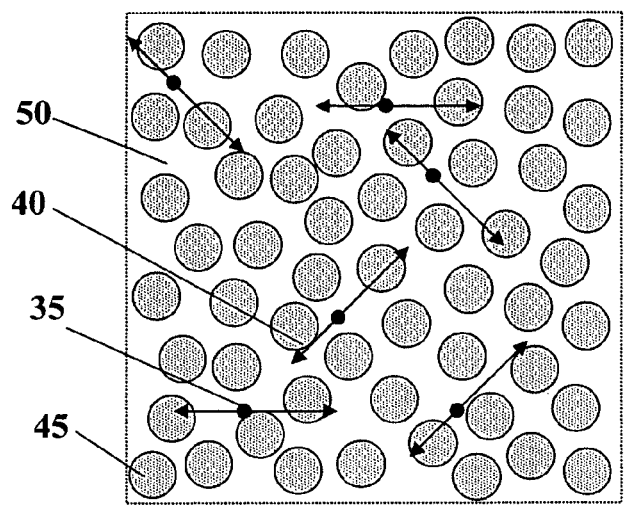
FIGS. 3a and 3b illustrate the effect of fluorescent dopant particle size on scintillator characteristics.
Figure 3B:
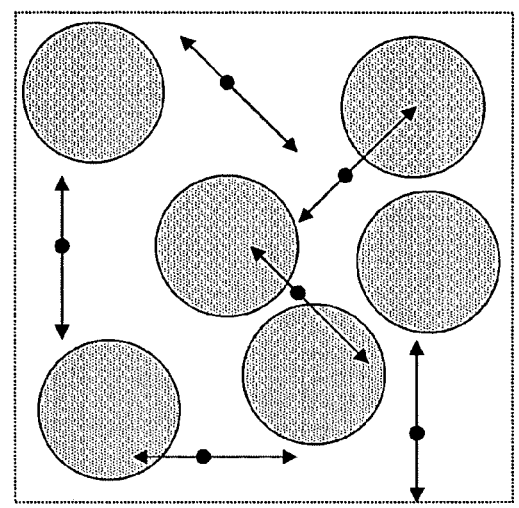
Figure 4A:
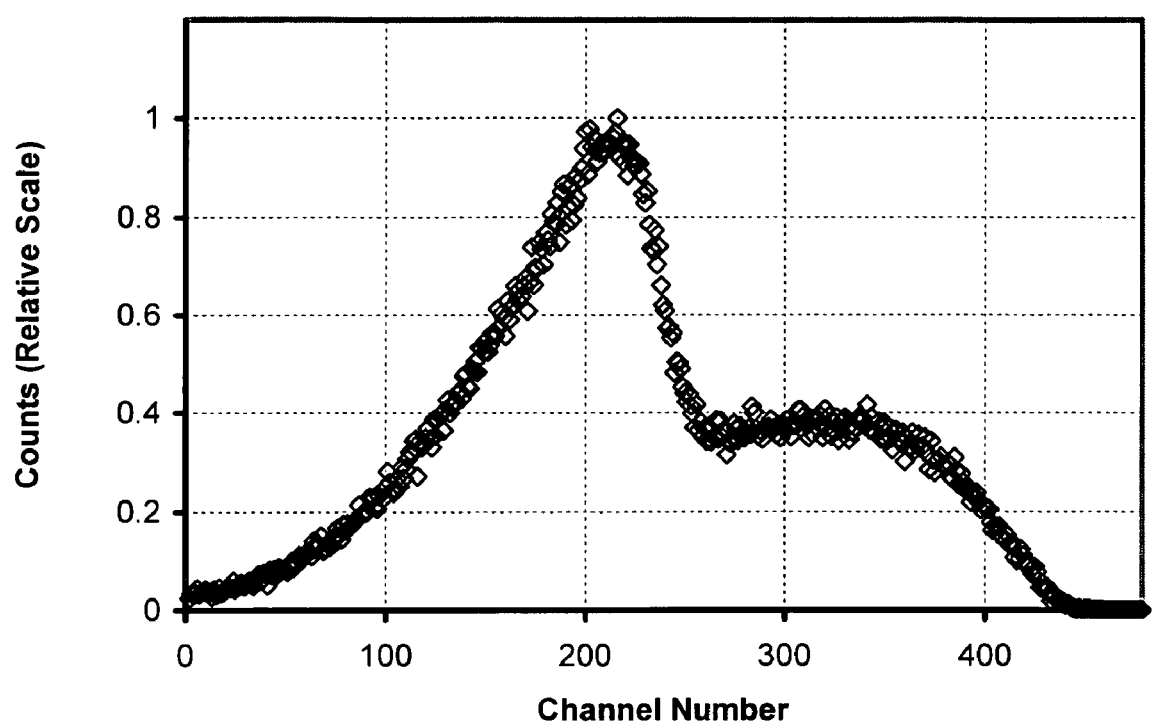
FIG. 4a shows the distribution of total energy from a single neutron capture event deposited in the fluorescent dopant particles by the $^6Li$ reaction products for fluorescent dopant particle radii of 5 microns.
Figure 4B:
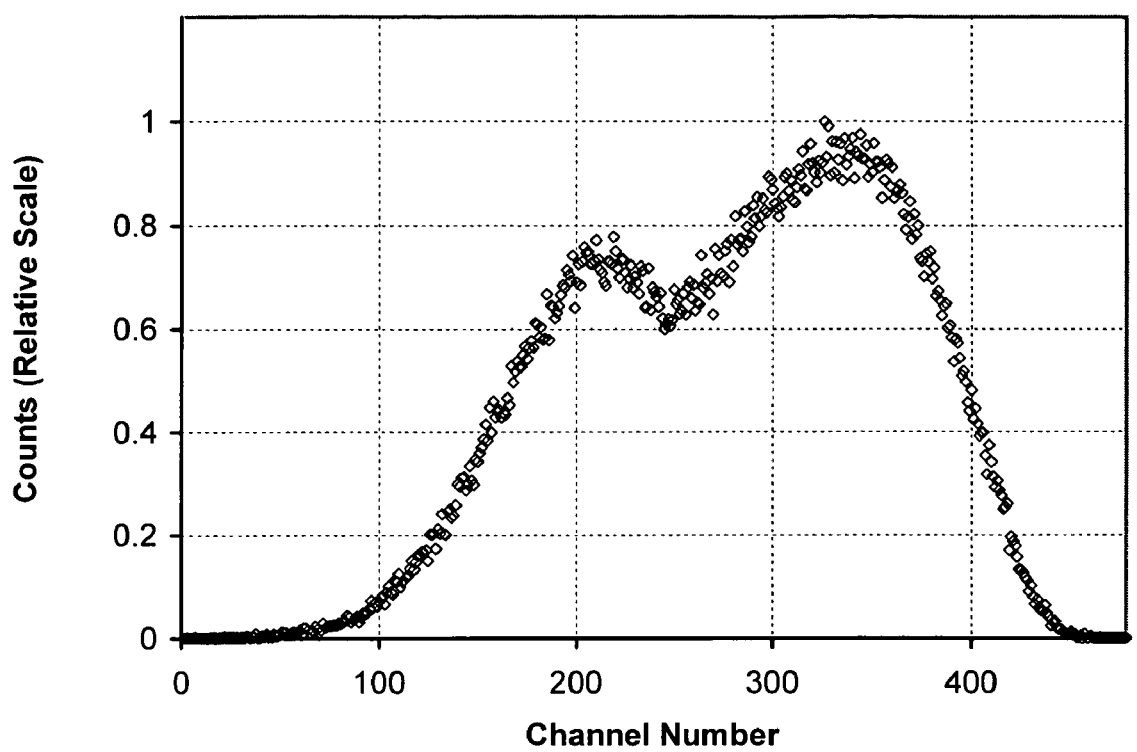
FIG. 4b shows the distribution of total energy from a single neutron capture event deposited in the fluorescent dopant particles by the $^6Li$ reaction products for fluorescent dopant particle radii of 2 microns.
Figure 4C:
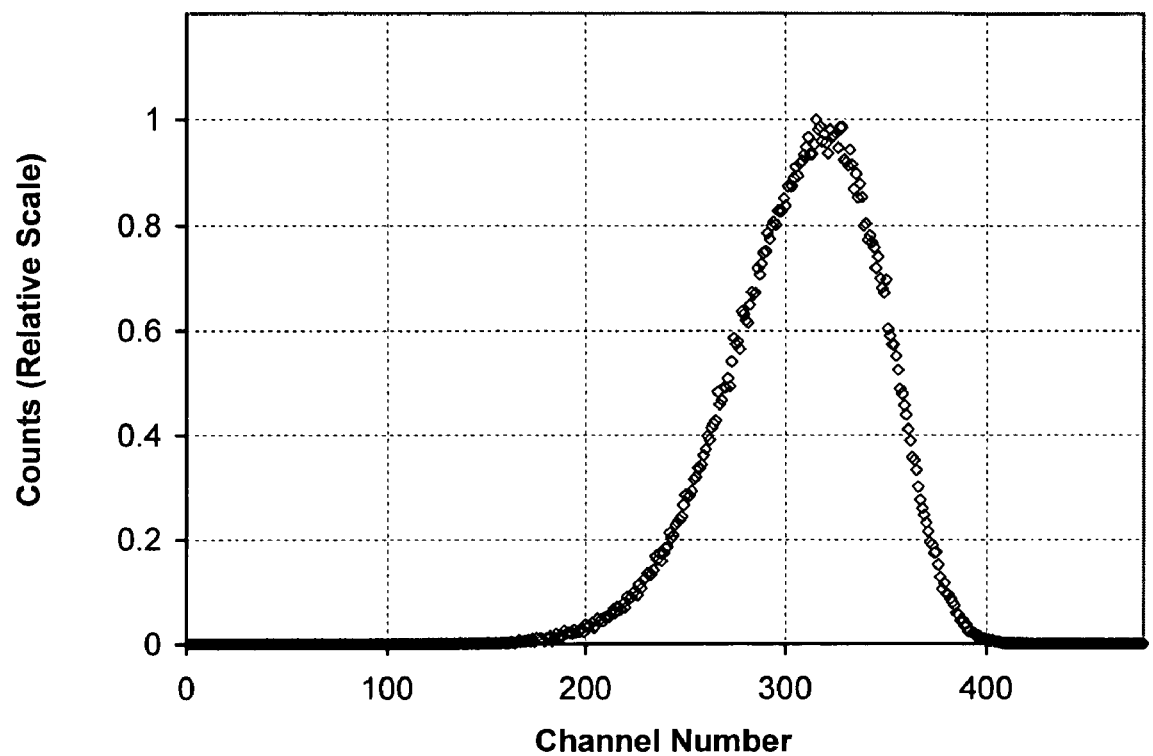
FIG. 4c shows the distribution of total energy from a single neutron capture event deposited in the fluorescent dopant particles by the $^6Li$ reaction products for fluorescent dopant particle radii of 500 nm.
Figure 4D:
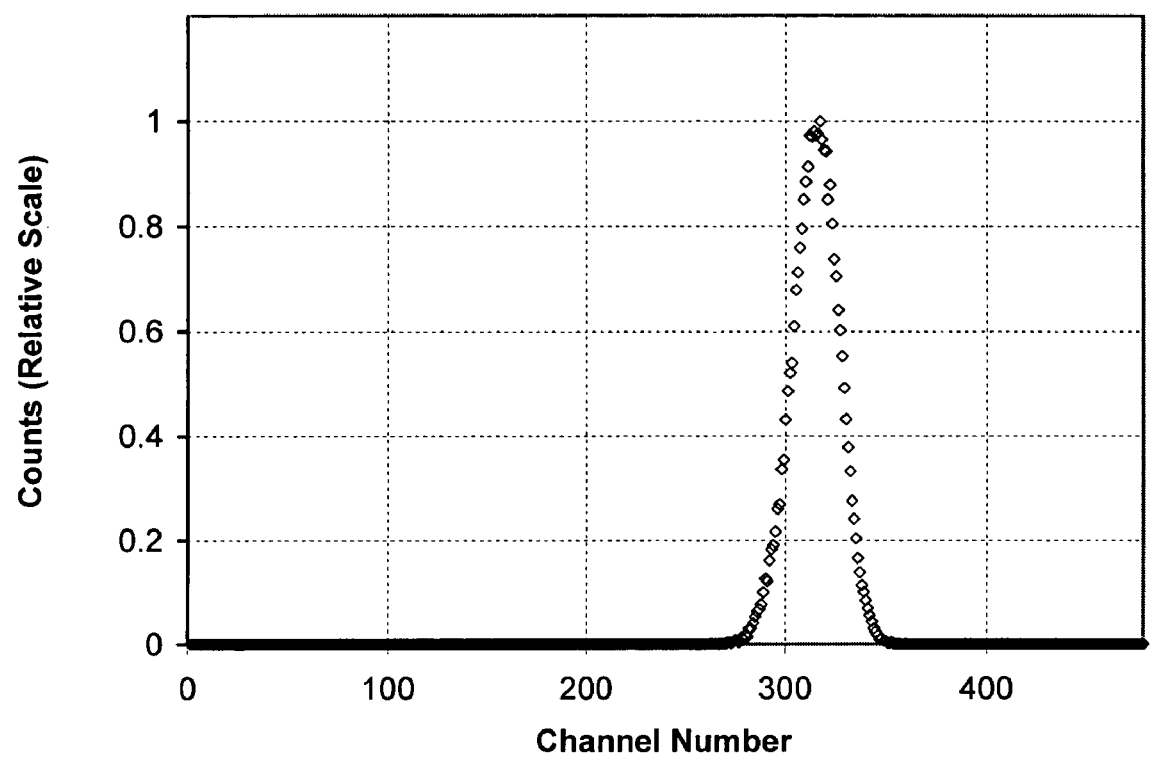
FIG. 4d shows the distribution of total energy from a single neutron capture event deposited in the fluorescent dopant particles by the $^6Li$ reaction products for fluorescent dopant particle radii of 50 nm.

It can be seen in FIG. 3b that when the fluorescent dopant particles are quite large, the reaction products from many neutron absorption events never actually enter a fluorescent dopant particle and thus do not deposit any energy in any of the particles. If energy transfer across the fluorescent dopant particle-matrix material boundaries is trivial (which is very often the case in composite scintillators), no scintillation light is produced by such events and the neutron is therefore not detected. In FIG. 3a, it can be seen that reducing the size of the fluorescent dopant particles increases the likelihood that scintillation light will be produced and reduces the variability in the intensity of scintillation pulses from one neutron capture to the next.

Calculations were performed for a number of different composite scintillator design cases. For purposes of illustration, results are shown for a composite scintillator consisting of ZnS:Ag fluorescent dopant particles embedded in lithium-bearing sol-gel glass.

FIG. 4 shows the distribution of total energy from a single neutron capture event deposited in the fluorescent dopant particles by the $^6Li$ reaction products for fluorescent dopant particle radii of (FIG. 4a) 5 microns, (FIG. 4b) 2 microns, (FIG. 4c) 500 nm, and (FIG. 4d) 50 nm. Standard composite scintillators (e.g. ZnS:Ag/6LiF) use fluorescent dopant particles with sizes of 5 microns radius or larger. The results of FIG. 4 clearly show improvement gained by moving to nano-sized fluorescent dopant particles. In addition to producing a very narrow peak, nano-sized fluorescent dopant particles also produce the largest scintillation pulses (x scale values represent pulse amplitude). Decreasing the fluorescent dopant particle size below 50 nm radius will produce an even narrower peak than that shown in FIG. 4d. It should be pointed out that the exact results obtained will vary somewhat with fluorescent dopant particle and matrix material densities and with the concentration of fluorescent dopant particles in the composite scintillator.

Figure 5:
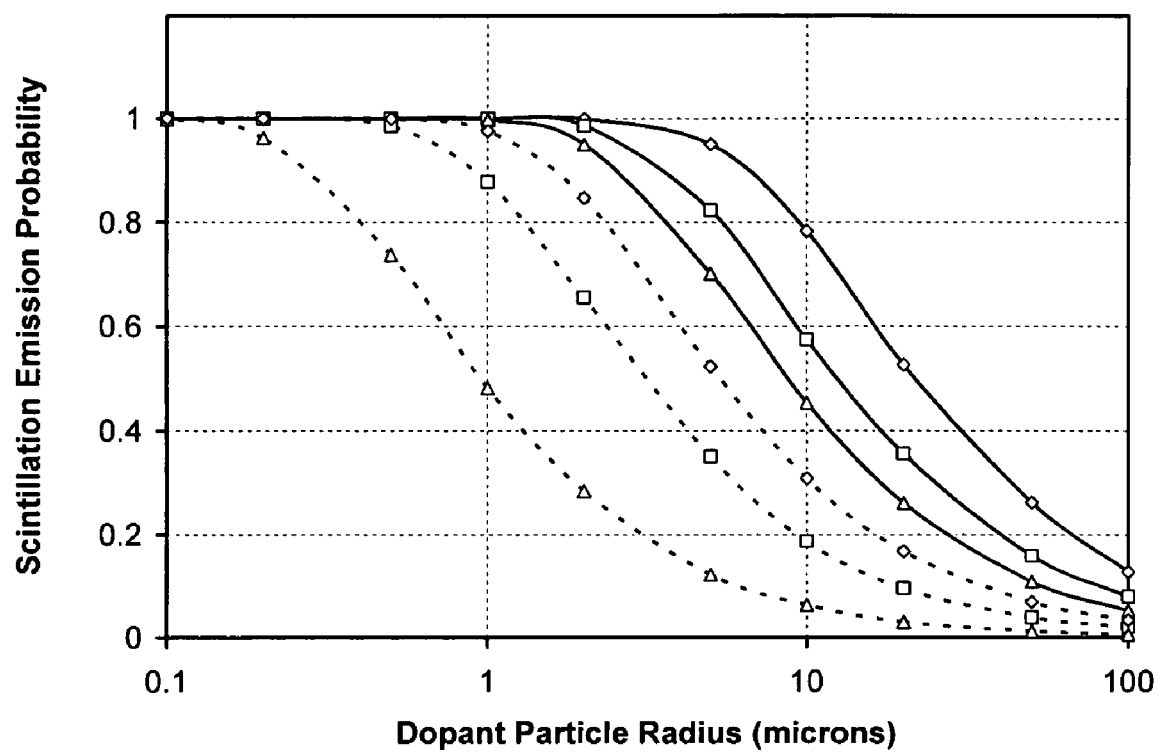
FIG. 5 shows the variation in the probability of the composite scintillator emitting scintillation light upon absorbing a neutron for volume doping fractions.

FIG. 5 shows the variation in the probability of the composite scintillator emitting scintillation light upon absorbing a neutron for volume doping fractions (in other words, the fraction of the composite scintillator volume consisting of fluorescent dopant particles) of: 0.3 (diamond, solid line); 0.2 (square, solid line); 0.15 (triangle, solid line); 0.1 (diamond, dashed line); 0.06 (square, dashed line); and 0.02 (triangle, dashed line). Again, it can be seen that very small fluorescent dopant particle sizes produce the best results. Again, exact results for any particular case will also depend on the densities of the fluorescent dopant particle and matrix materials.

The general embodiments presented herein are applicable to a wide variety of composite scintillator designs in addition to the case examined and discussed above; namely, spherical ZnS:Ag dopant particles embedded with a random distribution in a lithium-bearing sol-gel glass. For example, these general principles will also apply to composite scintillators consisting of neutron target material nanoparticles embedded in a fluorescent matrix, nano-sized layers or other shapes of fluorescent and/or target material comprising a composite scintillator, and to composite scintillators for detecting other types of particles besides neutrons.

One example of a composite scintillator for neutron detection is one in which nano-sized fluorescent dopant particles (e.g., ZnS:Ag particles with a diameter <450 nm) are dispersed at a high concentration (e.g., 25% of total volume) in a matrix containing neutron target material (such as lithium-6 atoms) and having reasonable optical transparency. The neutron target material can be an inherent part of the matrix material (e.g., $^6Li$ in a sol-gel glass) itself or can be in the form of particles dispersed in the matrix. Such a composite scintillator detects neutrons in the following manner. A neutron is absorbed by a $^6Li$ atom that promptly undergoes a nuclear reaction in which it splits into two reaction products, a triton and an alpha particle. These two reaction products have a combined energy of 4.78 MeV from the $^6Li$ reaction, plus any energy the neutron had when it was captured. The reaction products travel through the composite scintillator, depositing energy as they go. Energy deposited in the fluorescent dopant nanoparticles or nano-sized objects by the reaction products produces scintillation light emission that is detected by a photomultiplier tube or other photosensitive device (e.g., a photodiode). In this example, neutrons are discriminated from gamma rays by their pulse amplitude.

As a first example of a more advanced design of neutron scintillator, a scintillator is made that consists of many stacked layers in a sandwich-type format. Layers alternate between being composed of undoped transparent matrix material (an inert layer) and scintillation layers composed of, for example, lithium-bearing nanocrystals in a plastic scintillator matrix (the matrix material is the neutron target material). If the thickness of the scintillation layer were small relative to the path length of gamma-induced electrons in the material and the inert layers of a reasonable thickness, electrons would on average lose much of their energy in the inert layers, whereas the energy deposition from the neutron-induced reaction products would be primarily deposited in the scintillation layers. This would result in shrinkage of the gamma pulse amplitudes relative to those of the neutron pulses and would improve neutron-gamma discrimination. Making such a composite neutron scintillator is straightforward based on discussions presented herein. As an example, one way to make to make a composite neutron scintillator is to prepare a mixture of plastic scintillator precursor containing, for example, Li$_3$PO$_4$ nanoparticles, spin coat it to a uniform depth of 200 microns in a mold, and then polymerize the plastic scintillator using heat treatment. Another layer of plastic (but without any lithium nanoparticles or PPO/POPOP for light emission, thus making it inert) with the same optical index as the first layer is then deposited at a uniform depth of 500 microns over the first layer. This process is repeated and alternating layers of scintillating and inert material are built up to a total depth of, for example, 5 mm. The result is a composite scintillator with reduced gamma sensitivity.

Alternating layers must be made from matrix materials with chemical miscibility. For example, alternating layers composed of polymers with similar polarities (e.g., PS and PVT) or alternating layers composed of sol-gels can be made. The stepwise formation of one solid layer at a time, starting from the chemical solution to form the bottom layer, is required. Once one layer is hardened (taking about 1 week or more depending on the thickness of the layer), the solution of the next layer can be poured on top and chemical reactions forming covalent bonds inside the new layer takes place.

A different but related embodiment involves using nanoparticles that emit at the same wavelength of light doped at different concentrations in different scintillation layers (varying the nanoparticles concentration levels) in order to give different intensities of light emission per unit of energy deposited in each layer. This would cause some regions to count for more or less than others in terms of producing light output per unit of energy deposited in them and this is used as a means to make a composite scintillator that is much closer to being dose-equivalent for various kinds of radiation. One embodiment of this is to have nested spheres of scintillation material with greater concentrations of nanoparticles and perhaps neutron target material in the center of the compound object. The lower the energy of the neutron, the more likely it will be absorbed before traveling very far into the compound object. More energetic neutrons will on average travel farther into the object before being absorbed. Since these neutrons count for a much higher dose equivalency than low energy (and therefore low range) neutrons, higher nanoparticle doping concentrations are used in the interior regions in order to produce much more light output per neutron absorbed. This method is used for achieving a detector response that is much closer to dose equivalency. Optical isolation of multiple regions with readouts for each region could also be used for approximation of the neutron energy spectrum. This would be particularly effective if used in conjunction with different types of neutron target material demonstrating different responses to different neutron energy spectra.

Neutrons within particular energy ranges may be detected almost exclusively through the judicious choice and placement of neutron target materials. For example, the use of U-238 as the sole neutron target material in the composite scintillator or the scintillation regions of a compound structure results in sensitivity to only those neutrons having an energy of approximately 1 MeV or greater. The placement of neutron target materials in inert regions of a compound structure can also be used as a means to shield neutrons within various energy regions from certain scintillation regions of the structure and thus prevent them from producing scintillation pulses.

An extremely wide variety of neutron scintillators can easily be devised based on the principles of compound structures, wavelength tuning, energy sensitivity tuning, and other concepts. Additionally, composite scintillators containing elements with isotopes that are sensitive to neutrons can be made with isotopically enriched elements in order to greatly improve their neutron sensitivity. On the other hand, if such composite scintillators are intended for detection of other types of radiation besides neutrons and neutron sensitivity is not wanted, isotopically separated elements can be used to reduce or eliminate neutron sensitivity.

Gamma Scintillators. The high quantum yield (and therefore intensity of light emission) of the nanoparticles makes them well suited for use in gamma scintillators as greater numbers of photons emitted and collected result in better energy resolution of the gamma ray. In their most simple form, the gamma scintillators will consist of nanoparticles placed at a high doping level in the transparent matrix material. (Fluorescent nanoparticles need to be as small as possible and present at the highest concentrations possible in order to minimize statistical variations in the energy gammas deposit in the fluorescent nanoparticles.) The electron produced by a gamma ray interaction will travel through the scintillator, depositing energy in both the matrix material and the fluorescent dopant nanoparticles. Energy that eventually ends up in the nanoparticles in the form of excitons or electron-hole pairs will be converted into emitted photons. As with composite neutron scintillators, a variety of different designs and geometries may be used in addition to the basic design example given here.

Specific steps may be taken to optimize the composite scintillators for gamma detection and spectroscopy. Nanoparticles (not necessarily fluorescent) that contain high atomic number (Z) materials may be doped into the composite scintillator. This increases the cross section for gamma interaction in the composite scintillator, particularly for full absorption via the photoelectric effect, which is the desired interaction when performing spectroscopy. Furthermore, the use of multiple scintillation regions that emit light at different intensities per unit of energy deposited and even inert regions to act as shielding can yield gamma spectral information.

Charged particle scintillators. Charged particle composite scintillators based on nanoparticles doped into a transparent matrix may also be fabricated. Doping levels may be different in different layers or regions in order to bias the sensitivity of the detector in ways to achieve greater dose-equivalency or some other purpose. Dopants with high atomic numbers (high Z) may also be included if desired in order to reduce the range of the charged particles in the composite scintillators (this may also decrease tight output).

Scintillators having multiple functionalities for detecting different types of radiation with the signals from various types being easily separable. Composite scintillators having different regions with different properties (sensitivity to different types of radiation, light emission wavelength and intensity, etc) may be used to detect multiple types of radiation simultaneously with the signals from the different types being readily separable. A number of variations on this embodiment are possible. A simple example is that in which beads of transparent matrix material doped with neutron target material and fluorescent nanoparticles are in turn doped into a transparent matrix material that contains nanoparticles that fluoresce at a substantially different wavelength from the nanoparticles in the beads and perhaps nanoparticles of high atomic numbers (high Z) to increase the gamma interaction cross section. The beads will act as individual neutron scintillator elements dispersed within a large gamma composite scintillator. The size of the beads needs to be large relative to the path length of the reaction products yielded by the neutron target material upon absorption of a neutron. This will normally make them larger than the wavelength of the light they emit but this should not be a problem provided the bead transparent matrix material and the transparent matrix material in which the beads are placed have similar indices of refraction. The simplest way to ensure this is by using the same transparent matrix material in both cases, such as by using a sol-gel glass. Provided the neutron scintillator beads are not excessively large or concentrated in the composite scintillator, light emission from electrons produced by gamma ray interactions in the composite scintillator will most likely be at the wavelength of the nanoparticles in the gamma scintillation region surrounding the neutron scintillator beads. The result of all of this is that neutrons produce light at one wavelength and gamma rays produce light primarily at another, widely separated wavelength, with a small amount of light being produced at the same wavelength as the neutrons. By using photo detectors that are sensitive to one wavelength and relatively insensitive to the other wavelength, the result will be that neutron and gamma pulses may be easily distinguished and usefully counted in a simultaneous fashion from the same (composite) scintillator element. By using high quantum yield nanoparticles, light emission from the gamma rays are more than adequate to perform gamma spectroscopy that is comparable to or better than that of NaI:Tl.

Matrix materials. Any material that is optically transparent to the light emitted by one or more types of fluorescent nano-sized objects or nanoparticles and is capable of being doped with one or more types of such nano-sized objects or nanoparticles is capable of being used in the fabrication of a radiation scintillator. Possible materials that can be used to make these scintillators include, but are not limited to, glass, sol-gel glass, quartz, PS (polystyrene), PVT (polyvinyltoluene), and PMMA (poly(methyl methacrylate)). Sol-gel glass and plastic (e.g., PS, PVT) work well for this purpose as they are transparent to a wide variety of light wavelengths including UV and are formed at room temperature, permitting the use of dopants that are heat-sensitive (e.g. organics, many types of nanoparticles). Additionally, sol-gel glass and plastic beads can be placed in liquid sol-gel or liquid plastic precursors before the liquids solidify without the beads reverting to a liquid form. Standard glass is only liquid at very high temperatures and this would destroy many types of dopants as well as melt glass beads added to it, although this latter problem could be avoided by using different types of glass with different melting points. Quartz is also formed at high temperatures and would have the same problems. PS and PVT contain aromatic benzene rings which help transfer energy to fluors and some fluorescent nanoparticle dopants. PMMA is formed at low temperatures but the carbonyl groups it contains absorb UV light, a wavelength range that includes wavelengths that are very suitable for use with photomultiplier tubes (PMTs).

Fluorescent nano-sized objects. The nanoparticles used in Applicant's invention may be of any type that will produce appropriate light emission of an appropriate duration with sufficient intensity to be useful. Multiple types of nanoparticles may be used for this purpose; for example, a type of nanoparticles with very high quantum yield for light emission in the UV range may be used in conjunction with another type of nanoparticles that absorb in the UV and then emit in the blue for use with a PMT.

Figure 6:
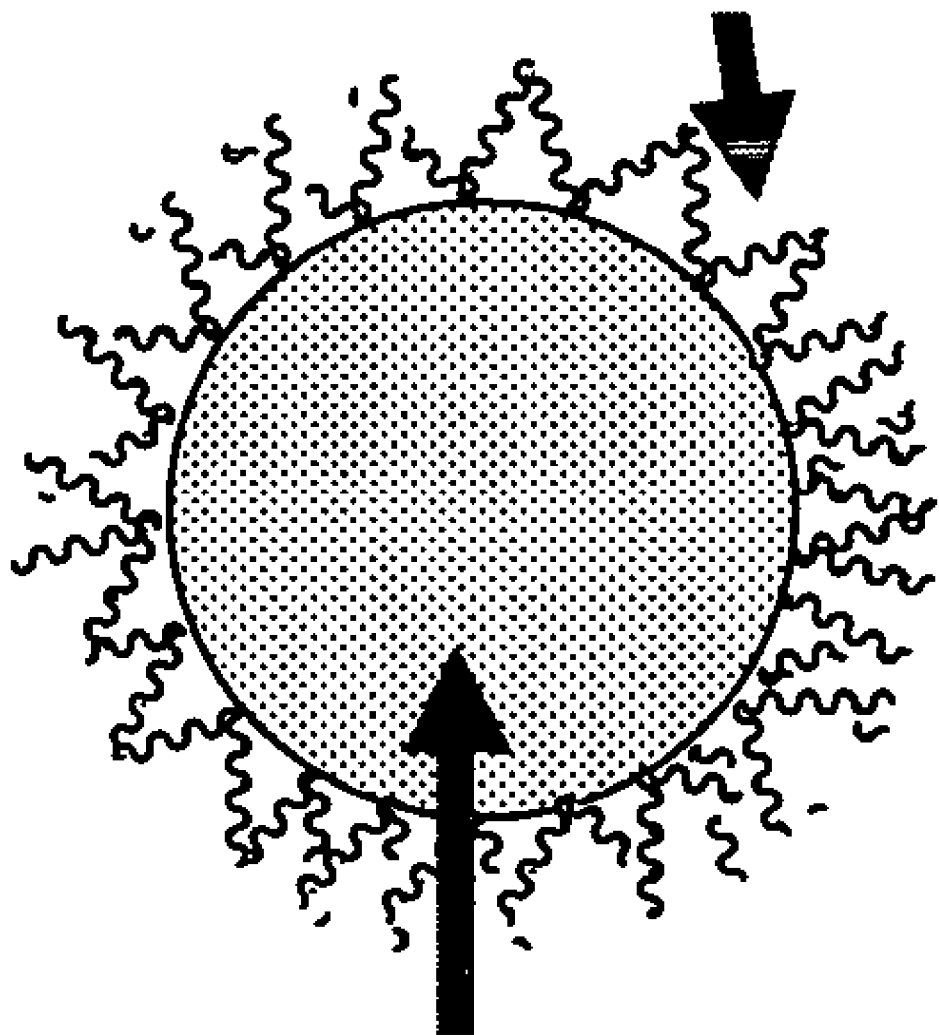
FIG. 6 is a schematic showing surface modification of nanoparticles using external functional groups or capping agents, rendering them dispersible in various hosts.

Any kind of fluorescent nanoparticles can be used, although some types of nanoparticles are much more suitable for use than others. Organic fluor nanoparticles can be used, such as POPOP (1,4-bis-2-(5-phenyloxazolyl)-benzene) and PPO (2,5-diphenyloxazole), in a nanoparticle format. Inorganic nanoparticles such as boron nitride and CdSe/ZnS core/shell can also be used. Other types of nanomaterials that can be used for Applicant's nanoparticles include ZnS, CdS, CdSe, ZnSe and their core/shell nanoparticles. Materials that are normally in a bulk form, such as NaI:Tl, can be synthesized in a nanoparticle format and be used in the scintillators. The nanoparticles can be crystalline or amorphous in nature. Various modifications can be made to them. For example, as shown in FIG. 6, the nanoparticles 55 can be coated with external functional groups or capping agents 60. Nanoparticles 55 capped with long chain organic ligands 60 can be made highly dispersible in organic hosts (e.g., polymers). On the other hand, nanoparticles capped with hydrophilic functional groups can be made highly dispersible in inorganic (e.g., liquid sol-gel precursor solutions) hosts. The results are clear scintillation materials having enhanced transparency. As another example, compound nanoparticles can be formed, such as an inner scintillation core surrounded by a shell containing neutron target material.

Syntheses of compound nanoparticles can be done under an inert atmosphere in an analogous manner to the synthesis of CdSe/ZnS core/shell nanocrystals, see Example 1 below. The first step involves the formation and isolation of scintillation cores, such as CdSe nanocrystals (See Example 1). The next step involves the slow addition of solution containing neutron target materials (e.g., Li-6) as shells to the scintillation core solution at a low temperature (100-170° C.). The scintillation cores acted as seeds for the growth of nanoparticle shells. The core/shell nanoparticles were then precipitated with anhydrous isopropyl alcohol and washed three times in copious amounts of fresh, anhydrous isopropyl alcohol.

Four types of scintillation inorganic nanocrystals were synthesized, namely CdSe/ZnS core/shell, doped $Y_2O_3$, doped $LaPO_4$, and doped ZnS nanocrystals. The synthesis involved the use of long chain coordinating agents, such as trioctylphosphine oxide, long chain amines, and phosphonic acid. In the presence of these surfactant molecules, reverse micelle structures were formed and the nucleation and particle growth of nanoparticle scintillators occurred only in the centers of reverse micelles, resulting in the control of particle sizes. At elevated reaction temperatures (150-360° C.), highly crystalline nanoparticles were formed.

The CdSe/ZnS core/shell nanocrystals with various particle sizes were synthesized by a two step method modified from the literature. The first step involved the size-controlled synthesis of CdSe nanocrystalline cores and the second step involved the passivation of CdSe core by the ZnS shell, the nanocrystals photoluminescence was enhanced by three orders of magnitude and the reported quantum yields were as high as 50%.

EXAMPLE 1

All syntheses and handling of CdSe/ZnS core/shell nanocrystals were preformed under an inert atmosphere. In a typical synthesis, cadmium acetate (100 mg) was dissolved in tri-n-octylphosphine oxide (6.0 g, TOPO) in a reaction flask. The temperature was then raised to 270° C. Into the reaction flask at 270° C., a solution of selenium (80 mg) in tributylphosphine (2.0 mL, CAUTION: pyrophoric) was swiftly injected. Upon injection of selenium solution, the reaction temperature dropped to around 250° C. The uniform CdSe nuclei were allowed to grow at this temperature (250° C.) for various lengths of time (from 0 to 3 min) to yield various sizes of nanocrystals which photoluminesce at wavelengths ranging from 470 to 550 nm. The reaction was then allowed to cool down to room temperature at which anhydrous methanol was added to precipitate CdSe nanocrystals. The obtained nanocrystals were washed three times with copious amount of fresh, anhydrous methanol. The next step is the capping of cores (CdSe nanocrystals) with shells (ZnS nanocrystalline layers). To prepare the surface, CdSe nanocrystals (37 mg) were refluxed in anhydrous pyridine (30 mL) overnight. To this CdSe dispersion at 100° C., a solution containing dimethylzinc (2 µL, CAUTION: moisture sensitive, pyrophoric) and bis(trimethylsilyl)sulfide (5 µL) in tributylphosphine (1.0 mL, CAUTION: pyrophoric) was injected dropwise. The reaction mixture was then cooled down to room temperature after which a large excess of dodecylamine (distilled) was then added. The highly luminescent CdSe/ZnS core/shell nanocrystals were then precipitated with anhydrous methanol and washed three times in copious amounts of fresh, anhydrous methanol.

To obtain water soluble nanocrystals, the surface ligand exchange with a hydrophilic ligand, dithiothreitol (DTT), was performed according to the procedure reported by Thompson and coworkers (Pathak et. al., J. Am. Chem. Soc., 2001, incorporated herein by reference). Throughout the procedure, all chemicals were handled under an inert atmosphere. In a small-scaled reaction, CdSe/ZnS core/shell nanocrystals (80 mg) were dispersed in anhydrous dioxane (5.0 mL) and dithiothreitol (2.0 g) was added. The dispersion was then refluxed for 12 h after which the nanocrystals were isolated and washed three times with copious amounts of fresh, anhydrous dioxane. Hydrophilic nanocrystals were then added during the preparation of lithiated ($^6$LiOH) gels. The resulting nanocrystal-based composite scintillators in sol-gel matrices were transparent and highly luminescent.

Figure 7:
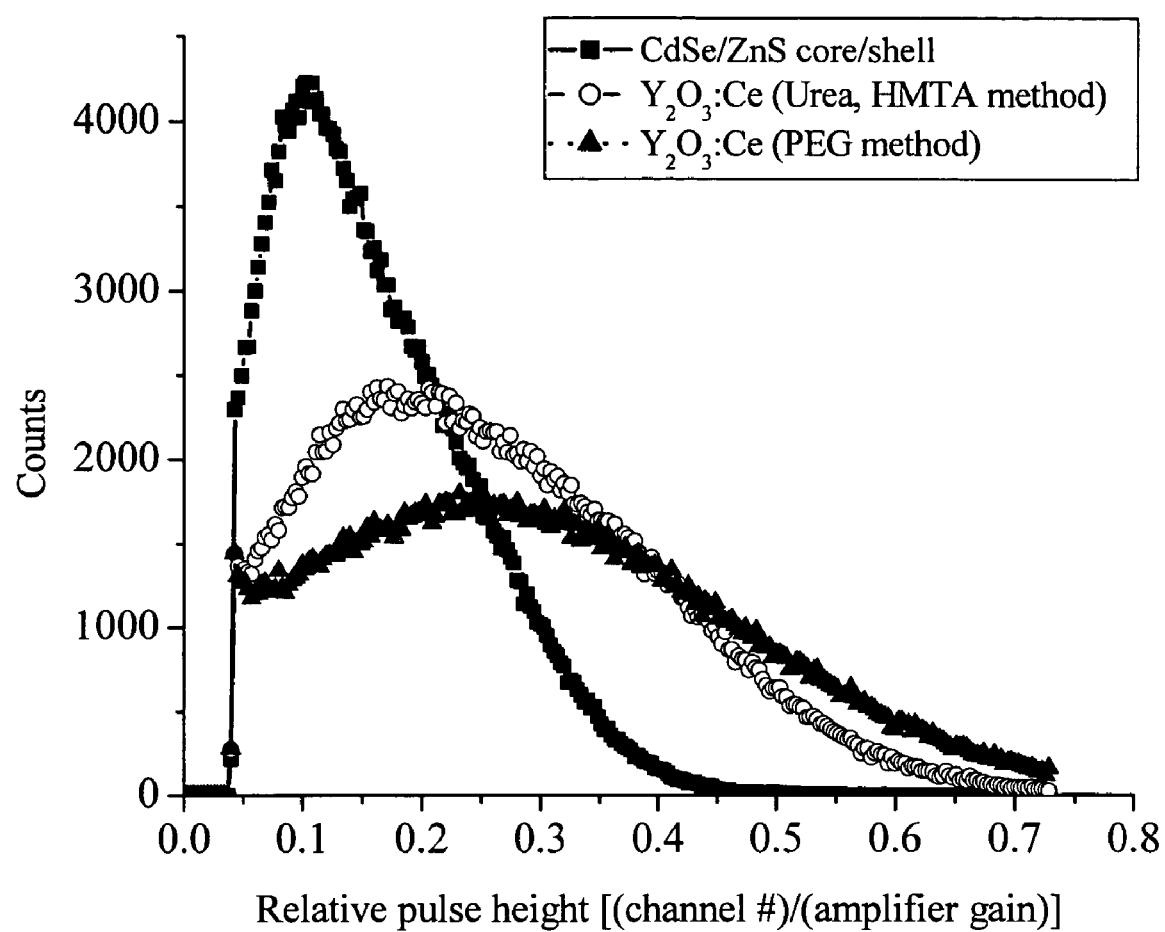
FIG. 7 is a series of superimposed alpha pulse height spectra of CdSe/ZnS core/shell and $Y_2O_3$:Ce nanocrystals.

A test scintillator sample was fabricated consisting of polystyrene doped with CdSe/ZnS core/shell nanocrystals with a peak fluorescence emission wavelength around 470 nm. Under an inert atmosphere, a concentrated dispersion of CdSe/ZnS core/shell nanocrystals in toluene (76 mg nanocrystals/mL solution) was prepared. Polystyrene (PS) powder obtained from grinding PS beads (14 mg) was then added to 0.18 mL of the nanocrystal dispersion. After the polystyrene powder was completely dissolved, 0.08 mL of the solution was applied evenly on a round-shaped, flat quartz disc (thickness: 1.6 mm, diameter: 25.4 mm). The solution was allowed to dry overnight to one day before the radiation detection test. The sample was irradiated with alpha particles from a 1.0 µCi $^{241}$Am disk source and the scintillation pulses were detected and recorded using a standard photomultiplier tube, amplifiers, and a computer-interfaced multichannel analyzer setup. FIG. 7 is a resulting spectrum of the scintillation pulses showing a well-defined alpha pulse height spectra of CdSe/ZnS core/shell (superimposed with alpha pulse height spectra of $Y_2O_3$:Ce nanocrystals).

$Y_2O_3$ nanocrystals with particle sizes between 10-30 nm were synthesized by various methods. The first method involved the slow decomposition of urea and hexamethylenetetramine (HMTA) at >50° C. generating an active reactant, ammonia, in situ. The reaction between ammonia and metal acetates in the centers of reverse micelles led to the formation of metal oxide nanoparticles. A typical synthesis of $Y_2O_3$ doped with $Ce^{3+}$ ($Y_2O_3$:Ce) by the decomposition of urea and HMTA was done under an inert atmosphere to prevent the oxidation of $Ce^{3+}$. Yttrium acetate hydrate (190 mg) and cerium acetate hydrate (13 mg) was dissolved in tri-n-octylphosphine oxide (22.5 g, TOPO) at elevated temperatures (100-200° C.). The clear, colorless solution was then cooled down to 50° C. at which the solution of urea (69 mg) and HMTA (79 mg) in deionized water (0.5 mL) was injected. The reaction mixture was heated to 250° C. and maintained at this temperature for 30 min. After that the reaction was cooled down to room temperature and the nanoparticles were precipitated with methanol and washed three times with copious amount of fresh methanol. The second method involved the use of poly(ethylene glycol) (e.g. PEG 8000) as a weakly coordinating agent and an oxygen donor. The mixture of metal acetates and PEG formed metal-PEG complexes inside reverse micelles. As metal-PEG complexes decomposed at elevated temperatures (>160° C.), metal oxide nanoparticles formed. The presence of small concentrations of charged ions, specifically $Ce^{3+}$, during the synthesis of $Y_2O_3$ led to the formation of $Ce^{3+}$ as impurities which acted as luminescent centers in the crystal lattice of $Y_2O_3$. The $Ce^{3+}$-doped $Y_2O_3$ nanocrystals ($Y_2O_3$:Ce) emitted light with a peak wavelength at 370 nm and a full width at half-maximum (fwhm) of about 50 nm.

Test scintillator samples were fabricated comprising polystyrene doped with $Y_2O_3$:Ce (5 mol % Ce) nanocrystals. Preparations of these samples were done in the same manner as that of CdSe/ZnS core/shell scintillation samples in polystyrene matrix. However, due to the higher stability of $Y_2O_3$ (than CdSe/ZnS), the inert atmosphere is not required. First, the dispersion of $Y_2O_3$:Ce nanocrystals (76 mg) in toluene (1.0 mL) was prepared. To 0.18 mL of this dispersion, 14 mg of ground polystyrene bead was dissolved. The solution was applied evenly on a round quartz disc and allowed to dry at least overnight before the test. Samples were irradiated with alpha particles from a 1.0 µCi $^{241}$Am disk source and the scintillation pulses were detected and recorded using a standard photomultiplier tube, amplifiers, and a computer-interfaced multichannel analyzer setup. FIG. 7 shows resulting pulse height spectra of scintillation pulses as well-defined alpha pulses. The pulses from $Y_2O_3$:Ce nanocrystals prepared by two different methods are similar in characteristics and their pulse heights are higher than that of CdSe/ZnS core/shell nanocrystals.

$LaPO_4$ nanocrystals with very small particle sizes (in the range of 3-8 nm) were synthesized by a method modified from the procedure reported by Haase and co-workers (Lehmann et. al. 2003). Applicant's synthesis involved the reaction between metal chlorides, acetates or nitrates with dry phosphoric acid ($H_3PO_4$) in mixed coordinating solvents at an elevated temperature (200° C.) for 2-16 hours, followed by capping of nanocrystals by a long chain amine, a phosphonic acid, a chelating agent or their mixture. The capping of nanocrystals by long chain organic functional groups renders them dispersible in organic solvents and consequently solid organic matrices, forming optically clear scintillation materials. All syntheses of $LaPO_4$:Ce were performed under an inert atmosphere to prevent the oxidation of $Ce^{3+}$. A typical procedure starts with the dissolution of lanthanum chloride heptahydrate (8.4 g) and cerium(III) chloride heptahydrate (931 mg) in methanol (15 mL). To this clear, colorless solution, tributyl phosphate (28 mL) was added and methanol was removed under vacuum. Phenyl ether (75 mL) was then added. This clear, colorless solution was heated to 80° C. and water was removed under vacuum. After that, a mixture of trihexylamine (27 mL) and 2 M phosphoric acid in hexyl ether solution (17.5 mL) was added. The reaction mixture was heated to 200° C. and maintained at this temperature for 2 h. The reaction mixture was then cooled down to 100° C. at which the surface modification of nanocrystals was performed by injecting a mixture of dodecylamine (6.6 g), hexyl ether (10 mL), and bis(2-ethylhexyl) hydrogenphosphate (12 mL). The surface modified $LaPO_4$:Ce nanocrystals were precipitated with methanol and washed three times with copious amount of fresh methanol. Alternatively, $LaPO_4$:Ce nanocrystals dispersed in either aqueous or organic matrices were also prepared by the combination of microemulsion and sonochemistry. Phosphoric acid, sodium phosphates, or ammonium phosphates were used to react with metal chlorides, acetates, or nitrates in micelle structures (including reverse micelles). Upon ultrasonication of the reaction mixture even at a low power (i.e., 30 W/cm$^2$), highly crystalline LaPO$_4$:Ce nanoparticles (3-4 nm) formed within a short time (i.e., 1 hour or less) without the need for external heating. The Ce$^{3+}$-doped LaPO$_4$ nanocrystals (LaPO$_4$:Ce) emitted light with a peak wavelength around 350 nm (fwhm of 50 nm) and quantum efficiencies around 30%.

Figure 8:
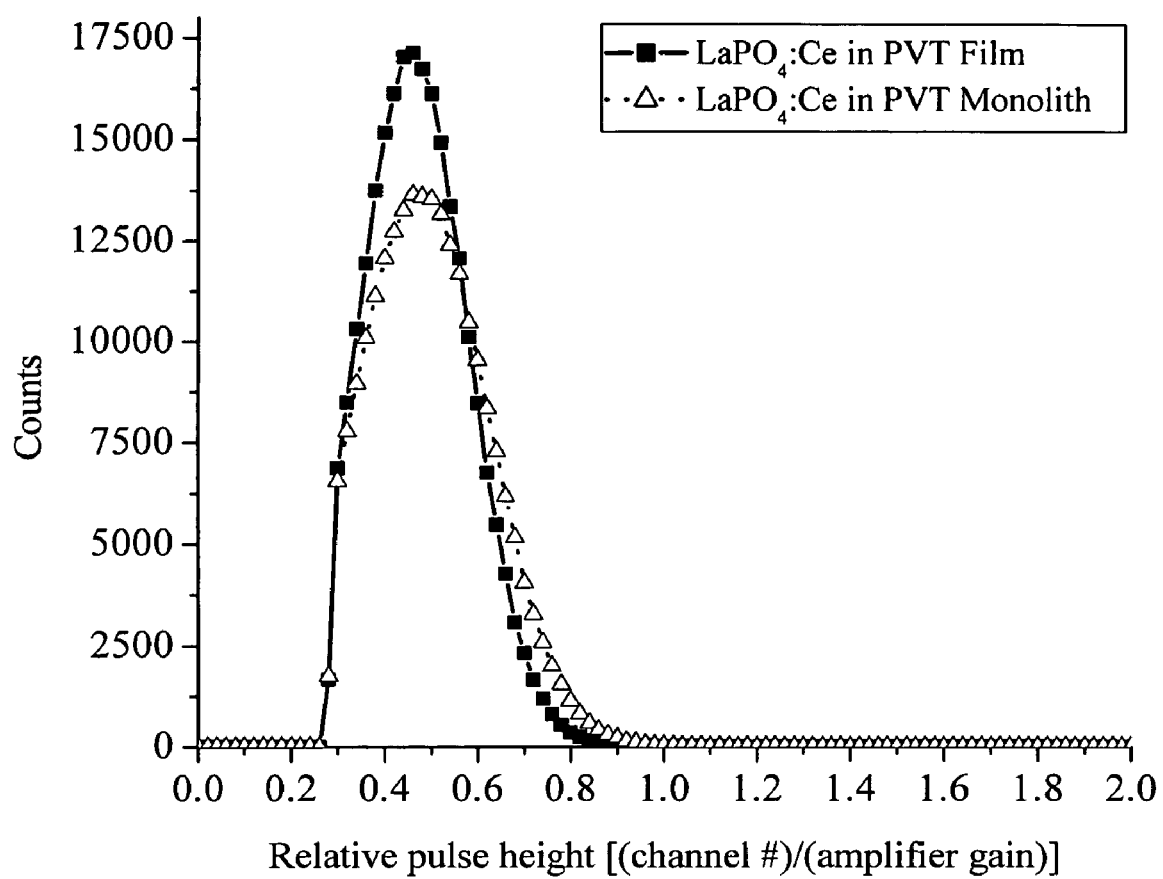
FIG. 8 is a series of alpha pulse height spectra of $LaPO_4$:Ce nanocrystal scintillator samples.

Test scintillator samples were fabricated comprising polyvinyltoluene doped with LaPO$_4$:Ce (10 mol % Ce) nanocrystals (50 wt %) in the form of a thick film (thickness: 1 mm) on a quartz disc and a monolith (thickness: 5 mm). A typical procedure for the fabrication of nanoparticles in polyvinyltoluene involves the polymerization of methylstyrene (or vinyltoluene) monomer solutions containing nanoparticles under an inert atmosphere. A 5-mm thick PVT monolith containing 50 wt % of LaPO$_4$:Ce nanocrystals was fabricated by dispersing LaPO$_4$:Ce nanocrystals (1.0 g) in freshly distilled methylstyrene (1.0 g). A free radical initiator (e.g., AIBN, 2 mg) was then added to the dispersion. The clear, colorless dispersion (1.6 mL) was transferred to the designated container (e.g., a plastic mold, a glass vial) and was purged with nitrogen gas to ensure an inert atmosphere. The dispersion containing nanocrystals under an inert atmosphere was then allowed to polymerize and solidify at 50° C. for 54 h. Samples with various thicknesses and different amounts of dopants (e.g., nanoparticles) can be made by varying the total volume of the dispersion and the amount of the dopants, respectively. Samples were irradiated with alpha particles from a 1.0 μCi $^{241}$Am disk source and the scintillation pulses were detected and recorded using a standard photomultiplier tube, amplifiers, and a computer-interfaced multichannel analyzer setup. FIG. 8 shows resulting pulse height spectra of scintillation pulses. Both the film and the monolith samples show well-defined pulses with very similar characteristics at about the same pulse height. The pulse height from alpha particle detection of LaPO$_4$:Ce is evidently higher than those of CdSe/ZnS core/shell and Y$_2$O$_3$:Ce nanocrystals. The alpha pulse of the monolith sample (thickness 5 mm) had lower counts than that of the film sample (thickness: 1 mm). This can be accounted by the low penetration depth of alpha particles as well as the increased light scattering as the thickness of sample increases.

Figure 9:
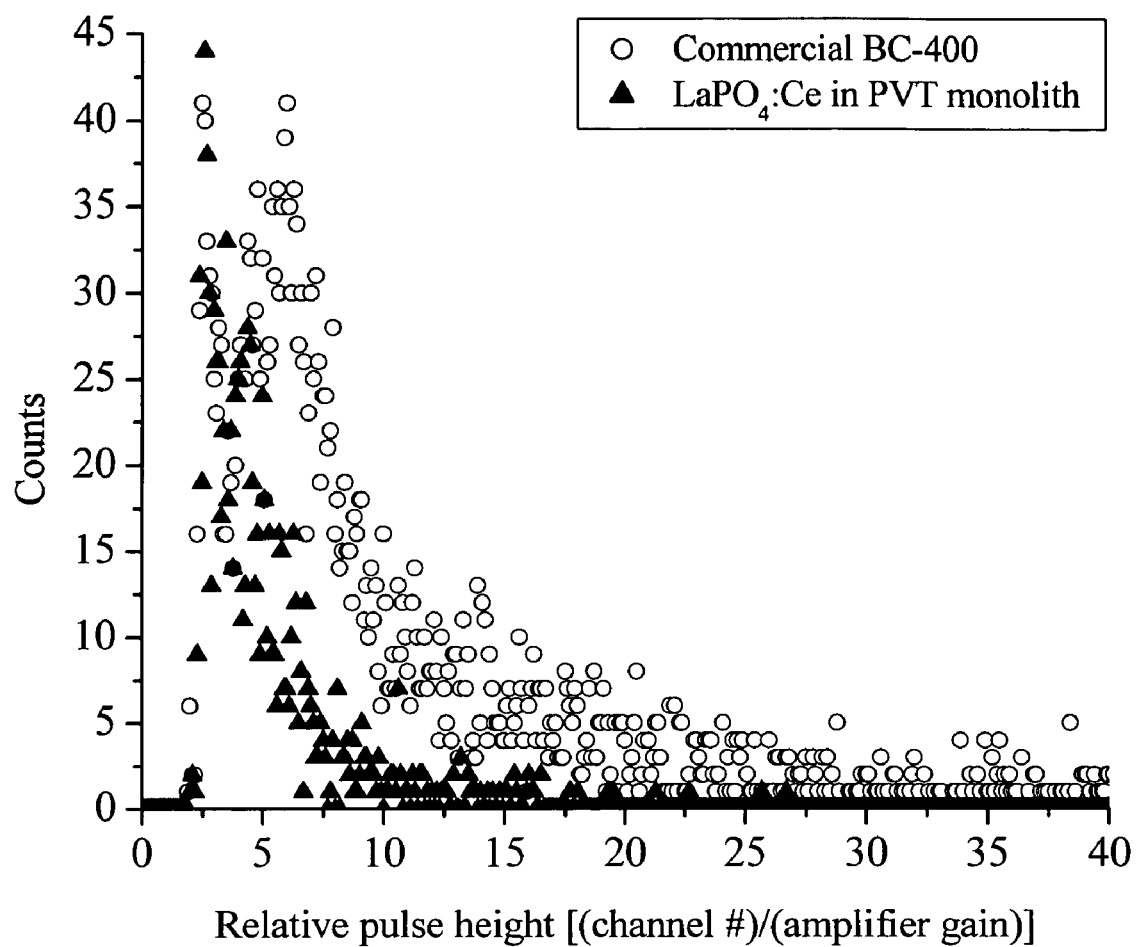
FIG. 9 is a series of superimposed neutron pulse height spectra based on proton recoil of $LaPO_4$:Ce nanocrystal compared with a commercial scintillator, BC-400.

The aforementioned LaPO$_4$:Ce in PVT monolith sample (thickness: 5 mm) was tested for the detection of neutron based on proton recoil. The sample was irradiated with neutron particles at the distance of 50 cm from a PuBe neutron source. The scintillator sample and PMT detector were shielded from fission gamma radiation by a 28-mm-thick lead brick at the distance of 25 cm away from the sample. Scintillation pulses were detected and recorded using a standard photomultiplier tube, amplifiers, and a computer-interfaced multichannel analyzer setup. FIG. 9 shows resulting pulse height spectrum of LaPO$_4$:Ce compared to a commercially available plastic scintillator, BC-4000 (Saint-Gobain Crystals & Detectors, Newbury and Solon, Ohio).

Figure 10:
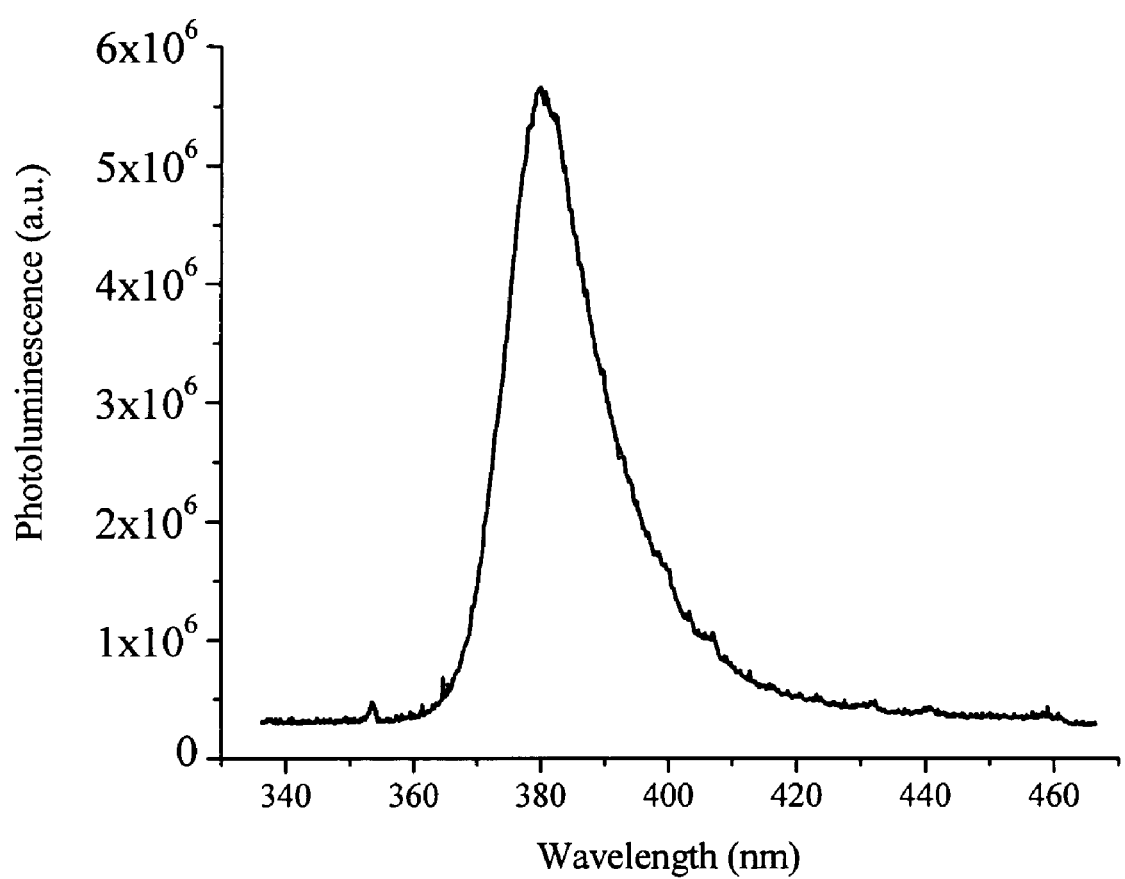
FIG. 10 shows a photoluminescence spectrum of ZnS nanocrystals with an excitation wavelength of 337.1 nm.

ZnS nanocrystals were synthesized at an elevated temperature, giving rise to highly crystalline and highly luminescent nanocrystals with a peak fluorescence emission wavelength at 380 nm. A typical synthetic procedure was performed under an inert atmosphere. Zinc oxide (33 mg) was allowed to dissolve in a mixture of tri-n-octylphosphine oxide (4.2 g, TOPO) and n-tetradecylphosphonic acid (200 mg) at 270° C. The temperature was then decreased to 100° C. at which silver nitrate (2 mg) was added. Then a solution of bis(trimethylsilyl)sulfide (0.1 mL) in tributylphosphine (0.2 mL, CAUTION: pyrophoric) was swiftly injected. The reaction was allowed to proceed at 100° C. for 4 min and then cooled down to room temperature. At room temperature, silver-doped ZnS nanocrystals were precipitated with anhydrous methanol and washed three times in copious amounts of fresh, anhydrous methanol. FIG. 10 is a photoluminescence spectrum of ZnS nanocrystals at the excitation wavelength of 337.1 nm using dye LASER. The photoluminescence band from the ZnS nanocrystals presented herein is much narrower (fwhm of 18 mm) than those reported on ZnS nanocrystals prepared at room temperature or by some other methods (fwhm of at least 80 nm). Sol-gel based neutron sensors containing $^6$Li and highly luminescent ZnS nanocrystals with various dopants, including Ag$^+$ and Ce$^{3+}$ were prepared as thick films.

One use of the invention includes fabrication of large area neutron scintillator sheets which may be used for two dimensional position-sensitive neutron detection for neutron scattering research. The emitted light may be focused onto an array of PMTs or transmitted into a crossed-fiber arrangement for piping scintillation light to two PMTs, one giving the x position and one giving the y position. The preparation of large area neutron scintillator sheets involved either sol-gel or organic matrices. In the sol-gel preparation, nanoparticle scintillators capped with hydrophilic functional groups and neutron capture materials were dispersed in sol-gel precursor solutions. The solution was poured onto large non-stick Teflon-lined molds and solvents were evaporated off in a controlled manner. Hydrothermal synthesis may also be applied to ensure the quality of crack-free sol-gel scintillation sheets. In the preparation of organic matrices, especially polymers, there are two methods of preparation. The first method involved polymerization reaction of monomers (e.g., styrene, methylstyrene, methyl methacrylate). Monomers were used as solvents to disperse nanoparticles in the presence of polymerization initiators. The commonly used polymerization initiators are, but not limited to, free-radical initiators (e.g., 2,2'-Azobisisobutyronitrile (AIBN)). Depending on the type of initiator used, polymerization then proceeded by UV irradiation or thermal initiation in non-stick molds. This step took overnight to about one week. The other method to prepare polymer matrices started from commercially available polymer beads. The solution containing nanoparticles and polymers in good solvent (e.g., toluene, benzene) was poured onto a nonstick mold and dried by evaporation of the solvent. Heating was sometimes applied to help accelerate the drying process.

Another use includes a composite neutron scintillator producing a photon spectral output containing neutron spectral information. This embodiment may be used for rough neutron spectral analysis (and thus potentially for calculating a rough dose-equivalent exposure rate). This would work most effectively with a fairly large neutron flux.

Another embodiment includes the use of Applicant's neutron scintillator in conjunction with a standard PMT/readout electronics combination to make a simple neutron survey instrument. Applicant's gamma scintillator may be used for survey purposes. In addition, when used in conjunction with multi-channel analysis hardware and software, Applicant's gamma scintillator can be used to identify the presence of specific radionuclides.

Applicant's multifunctional scintillator capable of detecting neutrons and performing gamma spectroscopy, may be used for monitoring purposes in order to protect fissile material from theft or to determine the presence of fissile material.

Lithium-containing nanoparticles. The prerequisite for neutron scintillators is the presence of neutron-target (such as neutron-absorbing) elements, such as lithium-6 to convert neutrons to detectable charged particles. The neutron scintillator of the present invention is provided for detecting neutrons by absorbing the neutrons in lithium-containing nanoparticles, including lithium oxide ($Li_2O$), lithium carbonate ($Li_2CO_3$), precursors of lithium oxide and lithium carbonate, and lithium phosphate ($Li_3PO_4$). (Other types of neutron target nanoparticles may be used as well, including different types of nanoparticles containing lithium-6 and/or different neutron target materials such as boron-10, U-235, etc.). When the neutron scintillator of Applicant's invention is bombarded with neutrons, and the lithium-6 absorbs a neutron, alpha and triton ions having a high kinetic energy are created. (Different types of neutron target nanoparticles produce different reaction products such as an electron, a proton, a triton, an alpha particle, a fission fragment or other particle of ionizing radiation.). As these charged particle reaction products travel through the composite scintillator, they exit the nanoparticle in which they originated and into the surrounding material, traveling through it and depositing energy by creating an ionized path. Energy deposited into fluorescent constituents of the composite scintillator (e.g. the matrix if it is fluorescent (e.g. composed of plastic scintillator), fluorescent nano-sized objects (e.g. nanoparticles or nano-sized layers) if they are present) generates scintillation output. Upon relaxation of the ions into a non-ionized state, photons are emitted. The photons are of a wavelength and duration characteristic of the scintillation, fluorescent material. Emitted photons and/or charged particles can be detected using standard UV and particle detection methods well known in the art, such as a photomultiplier, a silicon photodiode, a charge coupled device, an amorphous silicon screen, a microchannel plate, a channeltron or an avalanche photodiode.

Various reaction conditions including the decomposition of lithium-containing compounds inside reverse micelles were applied for synthesis. To increase the content of neutron target isotope (Li-6), the Li-6 containing nanoparticles were prepared and used instead of the naturally abundant lithium isotopes (7.42% Li-6, 92.58% Li-7). Samples of $Li_3PO_4$ nanoparticles with particles sizes around 30 nm, were prepared by the direct reaction between lithium salts dispersed in a long chain carboxylic acid and dry phosphoric acid. The reaction proceeded even at room temperature yielding crystalline nanoparticles. In a typical synthesis of $Li_3PO_4$, lithium oleate (1.5 g) was dissolved in a mixture of phenyl ether (10 g), tributyl phosphate (5 g), oleic acid (3 g), and trioctylamine (4.5 g) at 140° C. A solution of phosphoric acid (0.5 g, 35% $H_3PO_4$ solution) in hexylether was then added. The heat was removed immediately and the reaction mixture was stirred for 12 h. The surface modification of $Li_3PO_4$ nanocrystals can then be done either in-situ or after the working up of the reaction. In case of in-situ surface modification of nanocrystals, the reaction mixture was heated to 100° C. and a mixture of dodecylamine (2.8 g), hexyl ether (4.0 mL), and bis(2-ethylhexyl) hydrogenphosphate (5.0 mL) was added. The surface modification was allowed to proceed at 100° C. for 1 h. Then, the working up of the reaction was done by adding anhydrous isopropyl alcohol to precipitate $Li_3PO_4$ nanocrystals. The nanocrystals were washed three times with fresh, anhydrous isopropyl alcohol. In case that surface modification was done after working up the reaction, the nanocrystals would be dispersed in a mixture of dodecylamine (2.8 g), hexyl ether (4.0 mL), and bis(2-ethylhexyl) hydrogenphosphate (5.0 mL) for 1 h at 100° C. and the work up with isopropyl alcohol (as mentioned above) would follow. Surface modified $Li_3PO_4$ nanoparticles were highly dispersible in organic solvents, e.g., toluene. Transparent to translucent samples of neutron scintillators were made from the combination of Li-containing nanoparticles as neutron target material, a scintillator, a wavelength shifter, embedded in polymeric matrices. A monolithic sample of lithium-containing nanoparticle, an organic scintillator PPO, and a wavelength shifter POPOP, embedded in polyvinyltoluene gave large scintillation pulses upon the detection of thermal neutron. The scintillators embedded with lithium-containing nanoparticles were non-hygroscopic despite the hygroscopic nature of lithium-containing compounds.

Other lithium-containing nanoparticles that can be made include lithium silicates, lithium aluminates (e.g., $LiAlO_2$, $LiAl_5O_8$) and lithium zirconates (e.g., $Li_2ZrO_3$). Lithium silicates include lithium metasilicate $Li_2SiO_3$, $Li_2SiO_5$, $Li_3SiO_2$, lithium orthosilicate $Li_4SiO_4$, hexalithium metasilicate $Li_6SiO_5$, and octalithium monosilicate $Li_6SiO_5$, as well as their mixed alkoxide and hydroxide precursors. High lithium weight contents and satisfactory results have been reported as well on the following compounds: $Li_2O$, $Li_4SiO_4$ and $LiZrO_3$. Lithium oxides were prepared from the decomposition of lithium acetate in reverse micelles at an elevated temperature (>200° C.). Other multicomponent lithium oxides can be prepared by sol-gel reactions of alkoxides and hydroxides of lithium, silicon and zirconium or by Pechini-type reactions in reverse micelles at elevated temperatures.

Polymeric Scintillation Nanoparticles. Polystyrene or polyvinyltoluene nanoparticles containing an organic scintillator (e.g., PPO or 2,5-diphenyl oxazole) and a wavelength shifter (e.g., 2,2'-(1,4-phenylene)bis(5-phenyloxazole or POPOP) were made with particle sizes smaller than 60 nm. Methods of preparation of polymeric scintillation nanoparticles involved free-radical polymerization of monomers (e.g., styrene, methylstyrene, divinylbenzene) in the presence of organic scintillator and wavelength shifter. Thermal decomposition of a free-radical initiator (e.g., AIBN, ammonium persulfate) or ultrasonication was used to initiate the polymerization. Control of polymeric particles sizes was achieved by the use of surfactants, microwave irradiation or ultrasonication. A typical synthesis of polymeric nanoparticles containing PPO and POPOP was done under an inert atmosphere. In the first step, a 20 wt % surfactant solution (1.0 g of sodium dodecyl sulfate in 4.0 g of deionized water), an organic phase solution (200 mg of PPO and 4 mg of POPOP in 2.7 g of distilled styrene or methylstyrene monomer), and an aqueous phase (21.5 g of deionized water) were degassed at 25° C. Under a vigorous stirring, 2.5 g of the organic phase solution was transferred to the aqueous phase, followed by the addition of 1.3 g of the surfactant solution, resulting in the formation of micelle solution. The micelle solution was ultrasonicated at a low power (10-20 $W/cm^2$) in a cycle of 15-min on and 10-min off for the total length of 3 h. The obtained microemulsion was dialyzed against 2.5-L deionized water for 7 days, with the deionized water being changed frequently (at least twice a day). These nanoparticles were well-dispersed in aqueous or methanol solutions and can be embedded inside sol-gel hosts. Sol-gels can be made containing neutron target isotope, Li-6, for the purpose of neutron detection. Polymeric scintillation nanoparticles showed significant responses in beta-particle detection.

The composite scintillator of Applicant's present invention is useful for generating a signal in the presence of gamma radiation. Specific applications of the material of the present invention include, but are not limited to, monitoring spent nuclear fuel rods and determining fissile mass within remote handle transuranic waste. The material of the present invention is also useful in manufacturing a neutron detector so that a large area is observable for detecting neutrons at a relatively high resolution. The material of the present invention is capable of being replicated in order to provide a relatively large area (square meters) sensitive to neutrons.

The sol-gel process is a well-known and versatile solution process for making thin-film, glass, fiber-optic materials, as well as other materials. In general, the sol-gel process involves the transition of a system from a mostly colloidal liquid sol into a solid gel phase. The sol-gel processing is a low-temperature process requiring little or no heating. The gel can be doped with molecules having poor thermal stabilities which preclude their incorporation in traditional inorganic hosts. Such molecules become entrapped in the growing covalent gel network rather than being chemically bound to the inorganic matrix. By trapping suitable analytical reagents, sol-gel glasses have been used for the preparation of a wide variety of chemical-sensing materials, optical materials and sorbents.

The precursor or starting materials used in the preparation of the sol are usually inorganic metal salts or metal organic compounds such as metal alkoxides. In a typical sol-gel process, the precursor is subjected to a series of hydrolysis and polymerization reactions to form a colloidal suspension or a sol. Further processing of the sol enables the preparation of materials in different forms. In addition, when Applicant's sol is cast into a mold, a wet gel forms. With further drying and heat-treatment, the gel is converted into dense ceramic or glass material. If the liquid in a wet gel is removed under supercritical conditions, an aerogel is formed which is a highly porous and extremely low density material. If a wet gel undergoes evaporation of the liquid by drying the gel by means of low temperature treatments (25-100° C.), a porous, solid material is formed called a xerogel. The neutron target material of Applicant's invention includes at least one element selected from the group consisting of Li-6, B-10, Gd, U-233, U-234, U-235, U-236, U-238, Np-237, Pu-239, Pu-240, Th-232 and Am-241.

Specific neutron scintillators that can be made and used in Applicant's invention include ZnS:Ag and CaS:Ce fluorescent dopant particles or thin-film layers. Lithiated plastic spheres comprising $Li_3PO_4$ nanocrystals doped into plastic scintillator can be made wherein these spheres are then doped into plain (non-scintillation) plastic. Another way Applicant's present invention can be used is based on selection of fluorescent materials that give different pulse shapes for neutrons and gammas with pulse shape discrimination is used to separate them. Furthermore, in Applicant's invention, optimization of band structure can be used.

Another key factor in Applicant's present invention is that the quantum yield (and therefore light emission intensity) of fluorescent dopant nanoparticles and other nano-sized structures can vary with the size of the particles or structures. Certain nanoparticles (e.g., CdSe/ZnS) generally show increasing quantum yield with decreasing size due to quantum mechanical effects. Other fluorescent particles (e.g., ZnS:Ag, CaS:Ce or thin films with a good quantum yield in the bulk (e.g. micro-sized particles for ZnS:Ag and CaS:Ce) may not exhibit an increase in quantum yield with decreasing size, but in fact show a decrease as the surface-to-volume ratio of the particle increases. The reason for this is that most fluorescent particles have a certain number of surface defect sites on their surface. These surface defects allow exciton and/or electron-hole recombination without the emission of a photon and are effectively in competition with recombination sites inside the fluorescent particles that produce photon emission. Thus, the greater the surface-to-volume ratio of a fluorescent particle, the greater the loss of energy to surface defect recombination sites and the lower the quantum yield. For most fluorescent dopant particles a "sweet spot" (actually a range of sizes) exists where the particles are small enough to produce good optical transparency when doped in a transparent matrix material but not so small that quantum yield is substantially degraded. The exact location and size of the "sweet spot" varies with the specific characteristics of a particular type of fluorescent dopant particle such as the average travel distance of an exciton in the bulk material prior to recombination.

While there has been shown and described what are at present considered the preferred embodiments of the invention, it will be obvious to those skilled in the art that various changes and modifications can be made therein without departing from the scope of the invention defined by the appended claims.

What is claimed is:

1. A composite scintillator comprising a non-fluorescent transparent matrix containing therein microscale spheres encapsulating fluorescent nano-sized objects and a neutron target material.

2. The composite scintillator of claim 1, wherein said fluorescent nano-sized objects are fluorescent nanocrystals.

3. The composite scintillator of claim 1 wherein said neutron target material is a neutron absorbing material or a material that produces recoil ions upon scattering an energetic neutron.

4. The composite scintillator of claim 1 wherein the size of said nano-sized objects in at least one dimension is less than half the wavelength of light emitted by said composite scintillator.

5. The composite scintillator of claim 1 wherein said fluorescent nano-sized objects are nanocrystals having a core/shell structure comprising CdSe/ZnS.

6. The composite scintillator of claim 1 wherein said fluorescent nano-sized objects have a structure comprising ZnS:Ag.

7. The composite scintillator of claim 6 wherein said ZnS:Ag nano-sized objects have a diameter of less than 450 nm.

8. The composite scintillator of claim 1 wherein said fluorescent nanoparticles arc nano-sized objects have a structure comprising CaS:Ce.

9. The composite scintillator of claim 8 wherein said CaS:Ce nano-sized objects have a diameter of less than 550 nm.

10. The composite scintillator of claim 1 wherein said fluorescent nano-sized objects comprise metal chalcogenides.

11. The composite scintillator of claim 10 wherein said metal chalcogenides include ZnS, CdS, CdSe and ZnSe.

12. The composite scintillator of claim 1 wherein said fluorescent nano-sized objects comprise organic fluors.

13. The composite scintillator of claim 12 wherein said fluorescent articles-nano-sized objects further comprise a wavelength shifter.

14. The composite scintillator of claim 1 wherein said neutron target material includes at least one element selected from the group consisting of Li-6, B-10, Gd, U-233, U-234, U-235, U-236, U-238, Np-237, Pu-239, Pu-240, Th-232 and Am-241.

15. The composite scintillator of claim 1, wherein the neutron target material comprises lithium-6.

16. The composite scintillator of claim 15 wherein said neutron target material is comprised of lithium oxide, lithium carbonate, lithium phosphate, lithium silicates, lithium aluminates, lithium zirconates, or a precursor thereof.

17. The composite scintillator of claim 16 wherein said lithium silicates include lithium metasilicate, lithium orthosilicate, hexalithium metasilicate and octalithium monosilicate.

18. The composite scintillator of claim 1, wherein the non-fluorescent transparent matrix is hydrophobic.

19. The composite scintillator of claim 18 wherein said hydrophobic matrix material is a neutron target material.

20. The composite scintillator of claim 18 wherein said hydrophobic matrix material is a plastic.

21. The composite scintillator of claim 18 wherein said hydrophobic matrix material is a hydrophobic polymer matrix material.

22. The composite scintillator of claim 21 wherein said hydrophobic polymer matrix material is poly(methyl methacrylate), polystyrene, polyvinyltoluene, or a combination thereof.

23. The composite scintillator of claim 1, wherein the fluorescent nano-sized objects are selected from the group consisting of II-VI compositions.

24. The composite scintillator of claim 1, wherein the fluorescent nano-sized objects are selected from $Y_2O_3$:Ce and $LaPO_4$:Ce compositions.

25. The composite scintillator of claim 1, wherein said fluorescent nano-sized objects are coated with capping molecules that facilitate solubility of said fluorescent nano-sized objects in the matrix material.

* * * * *